US006738350B1

United States Patent
Gao et al.

(10) Patent No.: US 6,738,350 B1
(45) Date of Patent: May 18, 2004

(54) CONGESTION AVOIDANCE APPROACH FOR A SWITCHING COMMUNICATION SYSTEM WITH TRANSMISSION CONSTRAINTS

(75) Inventors: Zhengping Gao, Germantown, MD (US); Chi-Jiun Su, Derwood, MD (US); Stephanie Demers, Edison, NJ (US)

(73) Assignee: Hughes Electronics Corporation, El Segundo, CA (US)

( * ) Notice: Subject to any disclaimer, the term of this patent is extended or adjusted under 35 U.S.C. 154(b) by 735 days.

(21) Appl. No.: 09/625,289

(22) Filed: Jul. 25, 2000

Related U.S. Application Data

(60) Provisional application No. 60/189,764, filed on Mar. 16, 2000.

(51) Int. Cl.[7] .................... H04B 7/204; H04B 7/185; H04Q 7/20
(52) U.S. Cl. .................. 370/232; 370/316; 370/321; 370/326; 370/501; 455/427; 455/428; 455/429; 455/452.2
(58) Field of Search ................ 370/230, 232, 370/235, 328–330, 337, 338, 345, 347, 310.1, 310.2, 316, 321, 326, 501; 455/429, 453, 452.2, 422.1, 427, 428

(56) References Cited

U.S. PATENT DOCUMENTS 5,497,504 A    3/1996   Acampora et al.
5,649,291 A *  7/1997   Tayloe ........................ 370/332
5,946,625 A    8/1999   Hassan et al.
6,385,449 B2 * 5/2002   Eriksson et al. ............ 455/436

* cited by examiner

*Primary Examiner*—Dang Ton
*Assistant Examiner*—Robert C Scheibel
(74) *Attorney, Agent, or Firm*—John T. Whelan

(57) ABSTRACT

An approach for performing congestion avoidance in a switching communication system is disclosed. An input port of the switching communication system receives a bandwidth request from a source. The switching communication system includes a bandwidth control processor that examines the bandwidth request, and multiple output ports. The output ports communicate with various destination sites. A congestion avoidance logic within the switching communication system generates multiple clusters based upon a transmission constraint associated with the output ports; each of the clusters corresponds to a portion of the destination sites. The congestion avoidance logic determines a cluster threshold that corresponds to traffic load distribution among the critical clusters. Additionally, the congestion avoidance logic selectively grants the bandwidth request based upon the determined cluster threshold. This congestion avoidance mechanism has applicability to a packet-switched satellite communication system with an on-board switch; the switch has transmission constraints such that the transmitters of the satellite at the output port of the switch cannot simultaneously transmit to downlink cells, which contain station terminals that are within an interfering distance from one another.

52 Claims, 19 Drawing Sheets

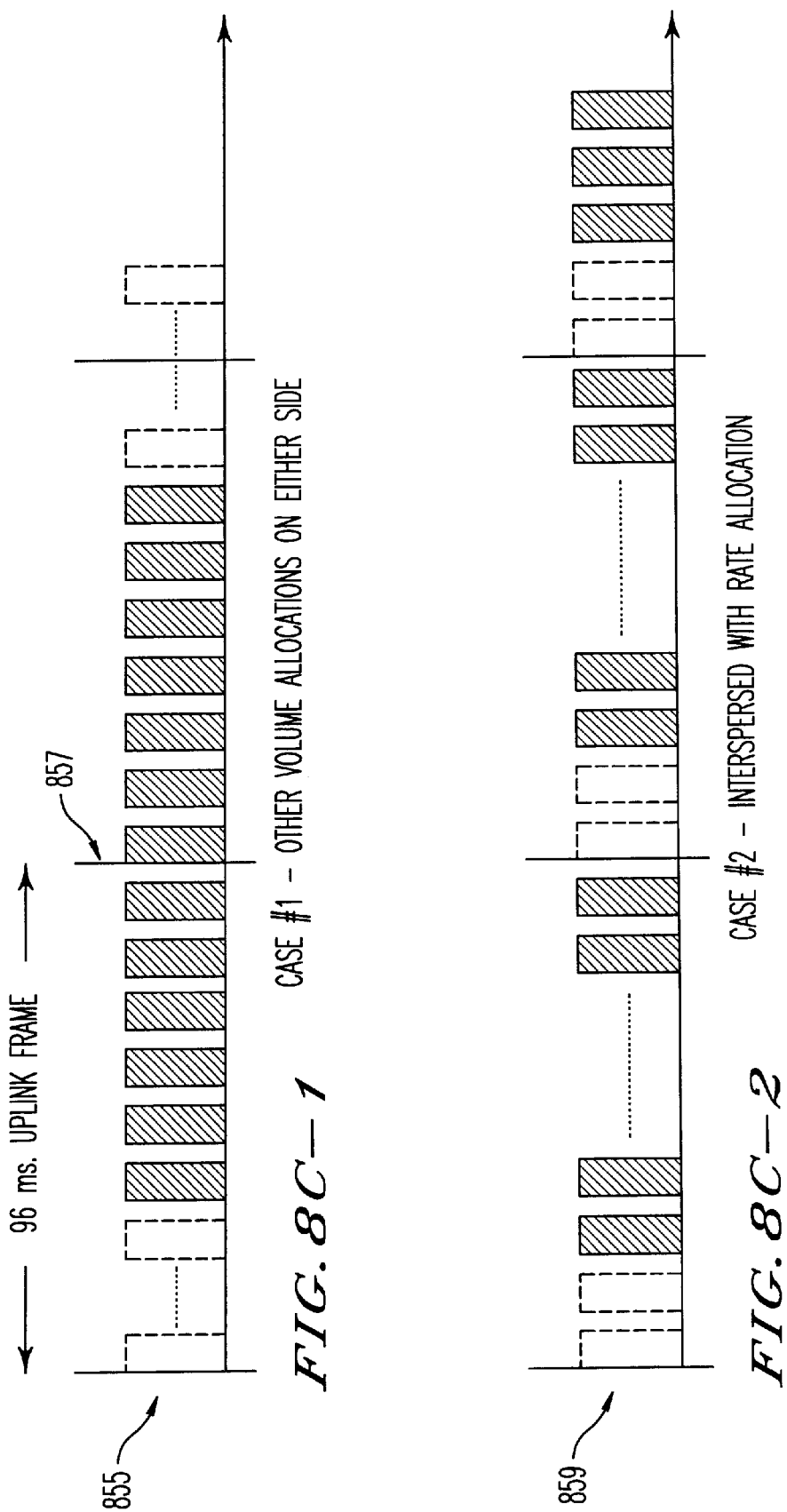

| 901 | 903 | 905 | 907 | 909 | 911 |
|---|---|---|---|---|---|
| DEST. ADDRESS | UPLINK RATE | REQUEST TYPE | RATE REQUEST | DEST. DOWNLINK | REQUEST PRIORITY |

| 921 | 923 | 925 |
|---|---|---|
| SOURCE ADDRESS | RATE/NO. OF SLOTS | LAST |

| 941 | 943 | 945 |
|---|---|---|
| SOURCE ADDRESS | REQUEST ID | TYPE |

CONGESTION AVOIDANCE APPROACH FOR A SWITCHING COMMUNICATION SYSTEM WITH TRANSMISSION CONSTRAINTS

CROSS-REFERENCES TO RELATED APPLICATION

This application is related to, and claims the benefit of the earlier filing date of, U.S. Provisional Patent Application Ser. No. 60/189,764, filed Mar. 16, 2000, entitled "A Congestion Avoidance Approach for a Switching Communication System with Transmission Constraints," the entirety of which is incorporated herein by reference.

BACKGROUND OF THE INVENTION

1. Field of the Invention

The present invention relates generally to communication systems, and is more particularly related to providing congestion avoidance in a switching communication system.

2. Discussion of the Background

As businesses and society, in general, become increasingly reliant on communication networks to conduct a variety of activities, ranging from business transactions to personal entertainment, these communication networks continue to experience greater and greater traffic congestion. For example, the maturity of electronic commerce and acceptance of the Internet as a daily tool pose an enormous challenge to communication engineers to develop techniques to reduce network latency and user response times. With the advances in processing power of desktop computers, the average user has grown accustomed to sophisticated multimedia applications, which place tremendous strain on network resources (e.g., switch capacity). Also, because the decrease in application response times is a direct result of the increased processor performance, the user has grown less tolerant of network delays, demanding comparable improvements in the network infrastructure.

Traffic control can be accomplished using two general approaches: flow control, and congestion control. Flow control seeks to regulate the amount of traffic that is transmitted to and from a source node and a destination node, by permitting the destination node to control the rate at which the source transfer data as to not overload the respective destination node. Flow control, however, does not directly address the problem associated with managing the traffic load on the network; for instance, numerous source nodes and destination nodes can be communicating at rates that are acceptable to the destination nodes. Nonetheless, the network (i.e., networking components) may not be able to sustain the overall level of traffic that is exchanged by these source and destination nodes.

Therefore, congestion avoidance schemes are needed to control the network traffic in a way as to effectively maintain the overall traffic that is introduced by the nodes. Without a congestion avoidance scheme, a large queuing delay will occur, potentially resulting in dropped packets. Consequently, the quality of service of the system will likely be degraded. Also, because the switch is forced to drop packets, the useful capacity of the system is reduced; thus, the network service provider suffers a loss of revenue.

One traditional approach to congestion avoidance is to upgrade the hardware to increase capacity to enhance the throughput of the system. The main drawbacks with this forklift approach are cost and potential lack of interoperability. Further, in some systems, such as a communication satellite, hardware replacement is impractical.

Another technique to avoid congestion involves the development of sophisticated networking protocols. One drawback with this approach is that the developed protocol may not be easily standardized; without industry acceptance, the development cost cannot be recouped. Another drawback is that the protocol is likely to be inefficient, requiring significant overhead bits to effect congestion control; this protocol inefficiency negatively impacts throughput of the network.

Based on the foregoing, there is a clear need for improved approaches for providing congestion avoidance.

There is also a need to optimize the use of existing network hardware.

There is also a need to minimize congestion without introducing protocol overhead cost.

Based on the need to improve system throughput, an approach for providing congestion control by optimizing switching system performance is highly desirable.

SUMMARY OF THE INVENTION

According to one aspect of the invention, a method is provided for performing congestion avoidance in a switching system having a plurality of input ports and a plurality of output ports. The method includes receiving a bandwidth request at one of the input ports, and generating a plurality of clusters based upon a transmission constraint that is associated with the output ports. Each of the clusters designates a portion of a plurality of destination sites. The method also includes determining a cluster threshold corresponding to traffic load distribution among a portion of the plurality of clusters. Further, the method encompasses selectively granting the bandwidth request based upon the step of determining the cluster threshold. Under this approach, congestion avoidance is provided using low complexity logic.

According to another aspect of the invention, a switching system for providing congestion avoidance comprises a plurality of input ports, in which one of the input ports receives a bandwidth request. A bandwidth control processor is coupled to the plurality of input ports and is configured to examine the bandwidth request. A plurality of output ports communicates with a plurality of destination sites. A congestion avoidance logic is configured to perform the following steps: generating a plurality of clusters based upon a transmission constraint that is associated with the output ports, in which each of the clusters designates a portion of the plurality of destination sites; determining a cluster threshold corresponding to a percent of a traffic load of one of the plurality of clusters; and selectively granting the bandwidth request based upon the determined cluster threshold. The above arrangement advantageously provides enhanced system throughput.

In yet another aspect of the invention, a computer-readable medium carrying one or more sequences of one or more instructions for performing congestion avoidance in a switching system having a plurality of input ports and a plurality of output ports is disclosed. The one or more sequences of one or more instructions include instructions which, when executed by one or more processors, cause the one or more processors to perform the step of receiving a bandwidth request at one of the input ports. Another step includes generating a plurality of clusters based upon a transmission constraint that is associated with the output ports, in which each of the clusters designates a portion of a plurality of destination sites. Another step includes determining a cluster threshold corresponding to traffic load distribution among a portion of the plurality of clusters. A further step includes selectively granting the bandwidth request based upon the step of determining the cluster threshold. This approach advantageously improves efficiency of the switching communication system.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 8A–8C are diagrams of the bandwidth request operation, rate allocation operation, and volume allocation operation, respectively, according to an embodiment of the present invention;

FIGS. 9A–9C are diagrams of the formats of a bandwidth request packet, an allocation packet, and an acknowledgement packet, respectively, in accordance with an embodiment of the present invention;

FIG. 13 is a flowchart of an update process of connectionless (CL) requests, according to an embodiment of the present invention;

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

The present invention accomplishes congestion avoidance by using a bandwidth control processor that examines received bandwidth requests in a switching system that has transmission constraints at the output. A congestion avoidance logic within the switching communication system generates multiple clusters based upon the transmission constraints associated with the output. Each of the clusters corresponds to a portion of the destination sites. The congestion avoidance logic determines a cluster threshold that corresponds to traffic load distribution among a portion of the plurality of clusters. Additionally, the congestion avoidance logic selectively grants the bandwidth request based upon the determined cluster threshold. This congestion avoidance mechanism has applicability to a packet-switched satellite communication system with an on-board switch; the switch has transmission constraints such that the transmitters of the satellite at the output port of the switch cannot simultaneously transmit to downlink cells that contain station terminals that are within an interfering distance from one another.

Figure 1:
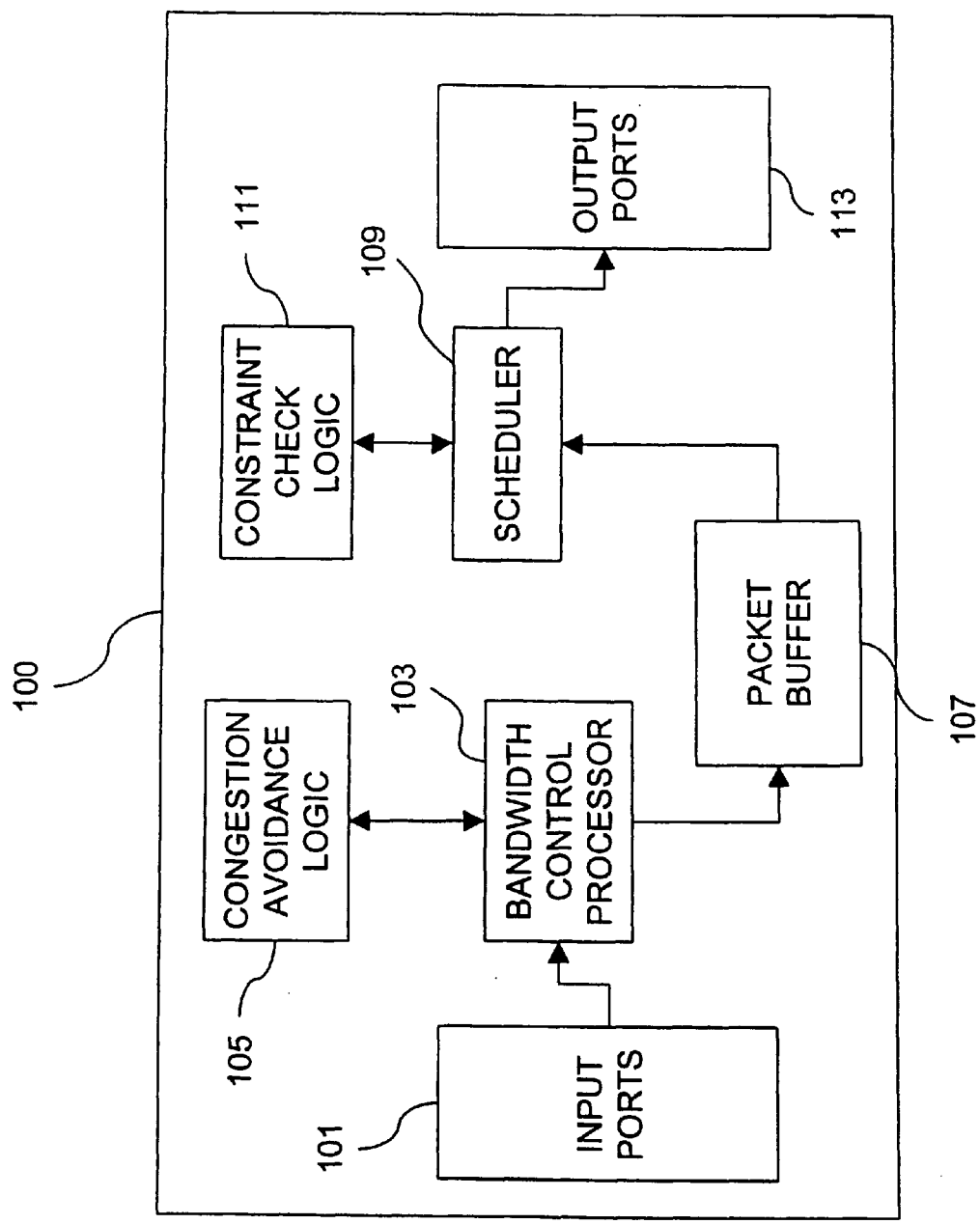
FIG. 1 is a block diagram of a switch with congestion avoidance capability, in accordance with an embodiment of the present invention.

FIG. 1 shows a functional block diagram of a switch with congestion avoidance capability, according to an embodiment of the present invention. Switch 100 includes multiple input ports 101 that receive incoming traffic from a source node (not shown) and forwards the traffic to a bandwidth control processor 103. A congestion avoidance logic 105 within switch 100 operates in conjunction with the bandwidth control processor 103 to control the amount of traffic entering input ports 101. A packet buffer 107 stores packets from input ports 101 that have been accepted for transmission by the bandwidth control processor 103. The stored packets in packet buffer 107 are transmitted to a scheduler 109, which communicates with a constraint check logic 111 to determine whether the stored packets conform with established transmission constraints. Scheduler 109 examines the destination addresses of the packets that are stored in packet buffer 107 using a round-robin scheme and forwards such packets to an appropriate output port among the various output ports 113. The congestion avoidance functionality of switch 100 is described below with respect to FIG. 2.

Figure 2:
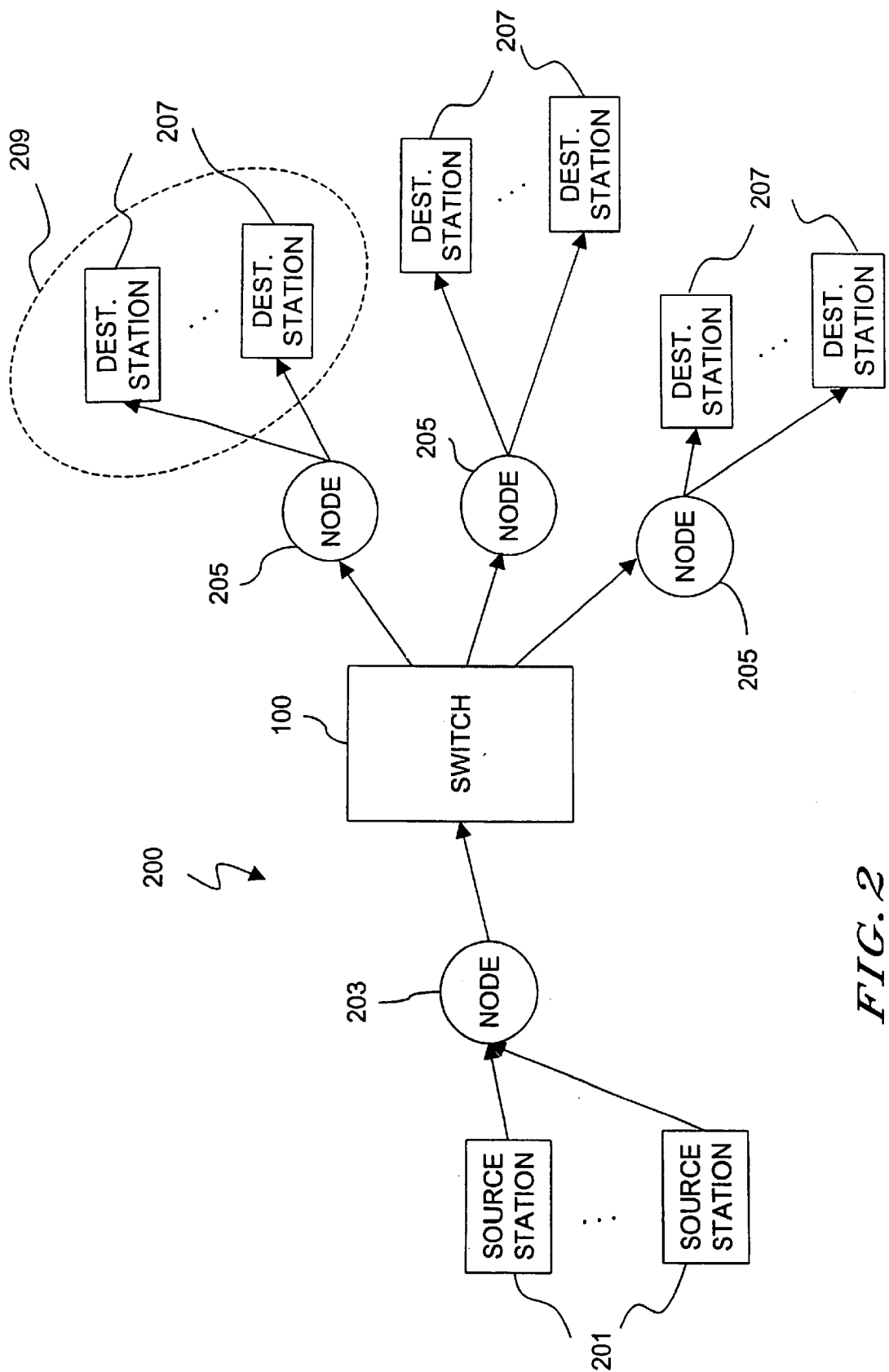
FIG. 2 is a diagram of a communication network that utilizes the switch of FIG. 1.

FIG. 2 shows a communication network that utilizes a switch with congestion avoidance functionality, in accordance with an embodiment of the present invention. A communication network 200 includes multiple source stations 201 that generate traffic to node 203, which can be any networking equipment that transfers data. In an exemplary embodiment, node 203 is an internetworking device, such as a router; alternatively, node 203 may be any type of gateway in a land-based or satellite-based communication system. Node 203 is connected to an input port (FIG. 1) of switch 100. The output ports (FIG. 1) of switch 100 connects to multiple nodes 205, which can be the same networking component as that of node 203. As shown, each of the nodes 205 can potentially communicate with numerous destination stations 207 within region 209 (e.g., sub-network). For example, if nodes 205 are routers, the routers would have multiple output ports designated for region 209.

As indicated previously, the conventional communication network exhibits performance characteristics that are dictated largely by the hardware limitations of switch 100. In other words, the throughput of the network 200 depend on such parameters as buffer size and processing capability of switch 100. In some practical systems, however, the communication network 200 possess network bottlenecks at points in the network other than the switch 100. For example, assuming that for security reasons, destination stations 207 within region 209 cannot simultaneously receive packets, consequently switch 100 may need to buffer some of the packets until the first set of packets are delivered to the particular destination stations 207. Thereafter, the buffered packets within switch 100 can be delivered to the destination stations 207 within region 209. From this example, it is clear that the buffering of the packets within switch 100 can result in system performance that does not depend on the hardware capabilities of switch 100, but instead on the network constraints associated with region 209.

The above scenario is characteristic of a satellite communication system. For the purposes of explanation, the operation of congestion avoidance according to an embodiment of the present invention, is discussed with respect to a satellite communication system with transmission constraints to downlink cells. However, it should be noted that the approach has applicability to many other switching systems, as recognized by one of ordinary skill in the art. For example, the switching systems may include an ATM (Asynchronous Transfer Mode)/SONET (Synchronous Optical Network) network, a Gigabit Ethernet network, and voice network. The end stations of these systems are referred to as destination sites. Accordingly, the destination sites in a satellite system would be downlink cells.

Figure 3A:
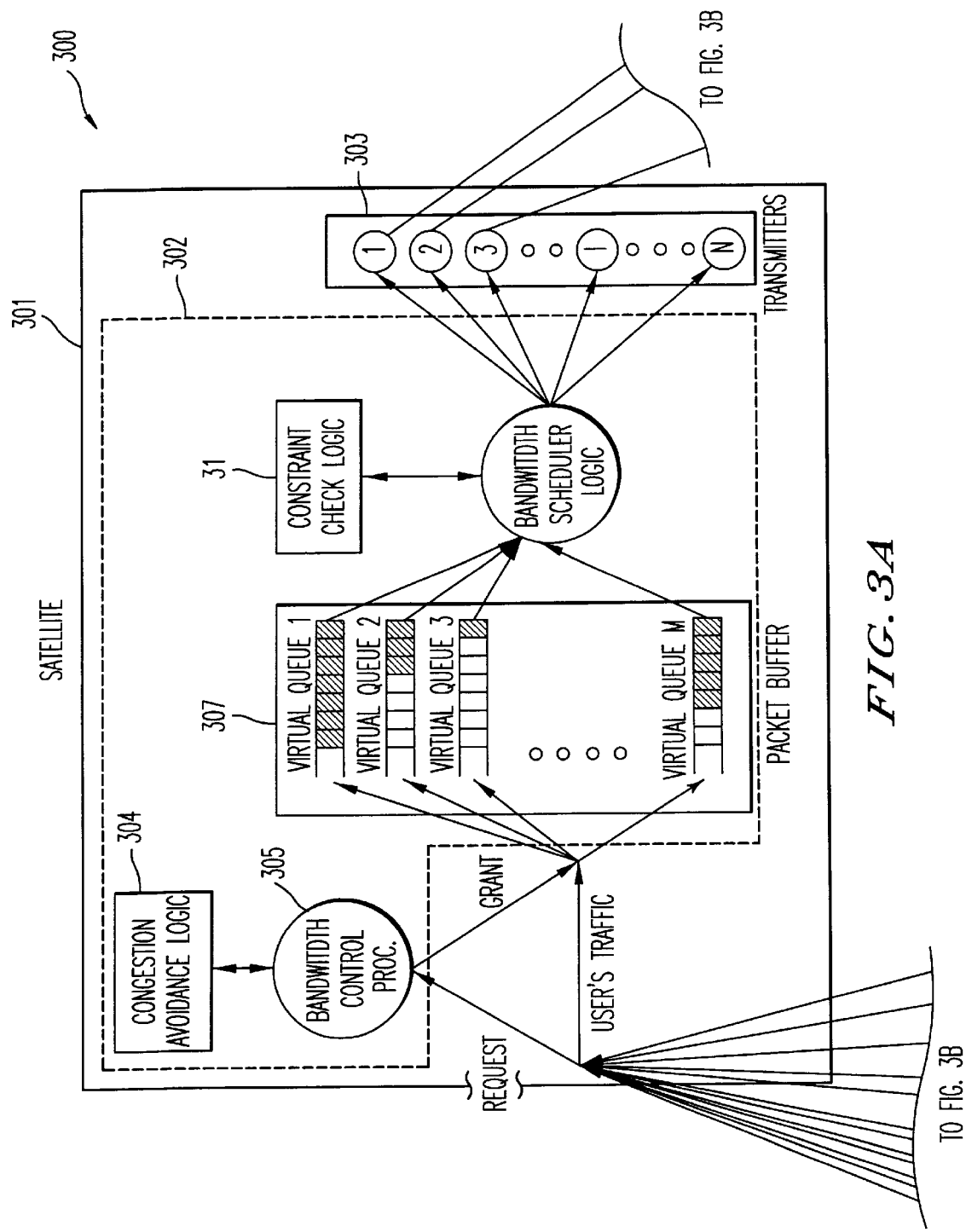
FIGS. 3A and 3B show a diagram of a satellite communication system with congestion avoidance capability, according to an embodiment of the present invention.
Figure 3B:
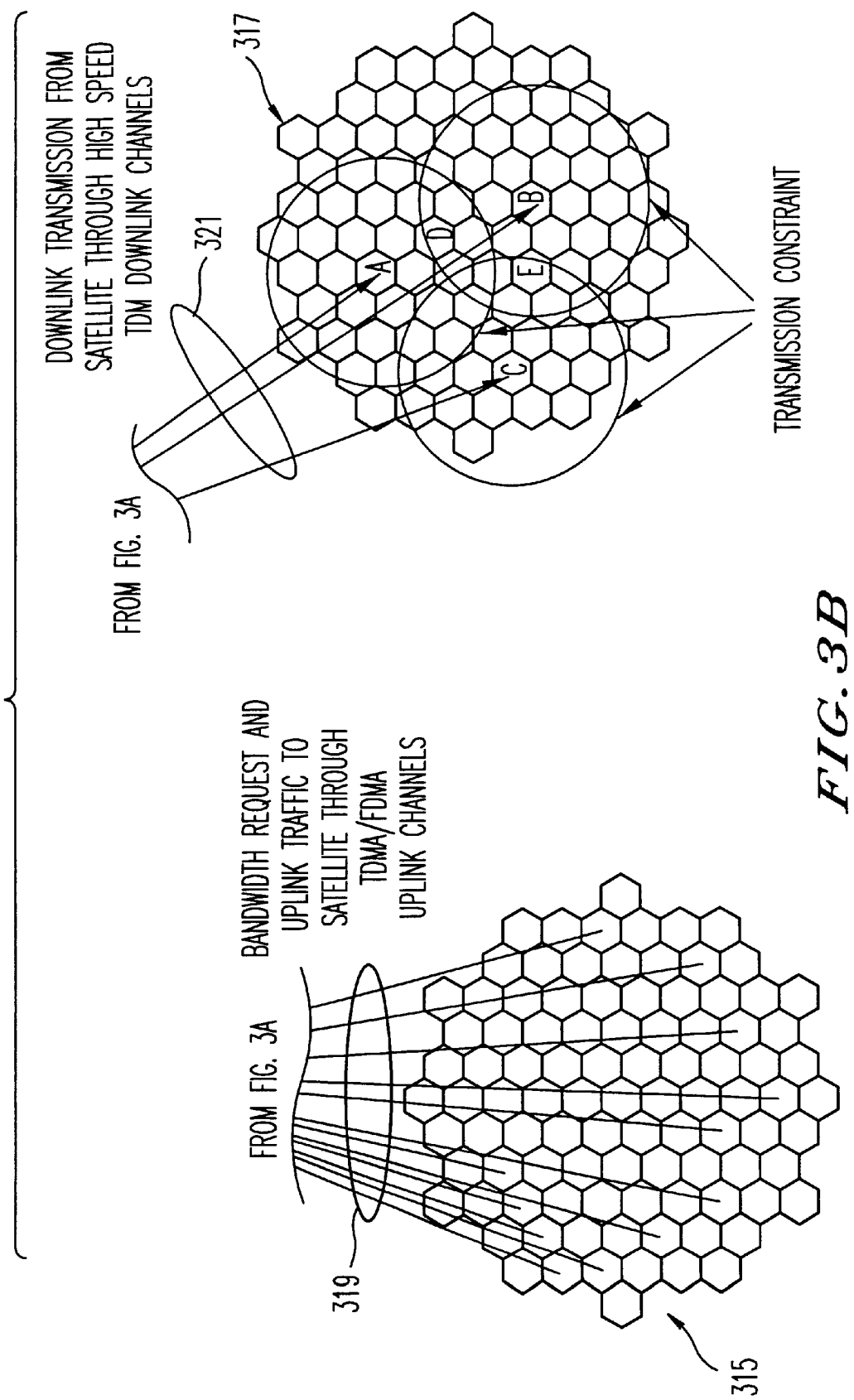

FIGS. 3A and 3B show a satellite communication system with an on-board switch, in accordance with an embodiment of the present invention. The satellite payload 301 has a switch 302 that is connected to multiple transmitters 303; that is, N transmitters. Switch 302 includes a congestion avoidance logic 304, a bandwidth control processor (BCP) 305, a packet buffer 307, a downlink scheduler 309, and a constraint check logic 311. One of ordinary skill in the art would recognize that the congestion avoidance logic 304, bandwidth control processor (BCP) 305, downlink scheduler 309, and constraint check logic 311 may be implemented via software, hardware (e.g., general processor, an Application Specific Integrated Circuit (ASIC), etc.), firmware or a combination thereof. As shown, the BCP 305 is a part of switch 302. Alternatively, the BCP 305 may be implemented as a separate processor that is separate from switch 302.

In switching communication system 300, station terminals (ST) (not shown) originate traffic from a coverage area 315. The generated traffic from the STs is transferred through switch 302 and terminate at destination STs (not shown) within coverage area 317. It should be noted that the destination STs can be within the same coverage area 315 as the originating STs. To effectively transmit traffic to the desired destination ST through switch 302, source STs transmit bandwidth requests to the bandwidth control processor 305 prior to transmitting any data traffic.

A connection that is established between a source ST and a destination ST is controlled by the BCP 305 and a network operation center (NOC). The NOC (not shown), which is based on the ground, provides management functions for the system 300. An ST needs to obtain authorization from the NOC before making a request to the BCP 305. However, once an ST has received authorization from the NOC, the ST is likely to receive a rate allocation from the BCP 305 because the NOC keeps track of the total uplink (and downlink) bandwidth available for connections and will block a connection request if there is insufficient satellite capacity available to satisfy the request.

A key source of congestion in the system 300 lies with the downlink channels 321. Accordingly, the bandwidth control processor (BCP) 305 implements the bandwidth control function which includes controlling the allocation of uplink channels and timeslots and mitigating downlink congestion. Bandwidth control processor 305 examines the requested bandwidth and replies with grants based on downlink resource availability, as determined by congestion avoidance logic 304 and uplink resource availability. As will be explained in greater detail later, congestion avoidance in the system 300 is achieved by the collaboration of bandwidth control processor 305 and congestion avoidance logic 304 to regulate the amount of traffic received by the switch 302 through TDMA (Time Division Multiple Access)/FDMA (Frequency Division Multiple Access) uplink channels 319 via request/grant bandwidth control processes.

The system 300 operates in the 29.5–30.0 GHz Earth to Space direction and operates in the 19.7–20.2 GHz Space to Earth direction (i.e., "A" band), in accordance with one embodiment. There is therefore 500 MHz of spectrum available in each direction of transmission. The 500 MHz is divided into 8 sub-bands each 62.5 MHz wide. The frequency band that is used to carry traffic from STs to a satellite's payload 301 within each cell (uplink beam) encompasses one or more 62.5 MHz sub-bands. Each sub-band is further divided into a number of channels that operate at three different bit rates. For convenience, these channels are referred to as 512 kbps, 2 Mbps, and 16 Mbps channels, although both the total bit rates and the net user data rates for each of these channels is somewhat above these nominal figures. The 512 kbps channels have two operating modes, a normal mode, and a fall-back mode, which can be used during rain fades to provide additional link margin. The uplink frame structure, in an exemplary embodiment, during normal operation is a 96 ms frame with 32 slots of 3 ms each, supporting uplink channel rates 512 kbps, 2 Mbps, and 16 Mbps. The number of packets within a slot varies by channel rate. Each time slot is sized to match one uplink-transmitted burst. Each burst has a header and a body. The header contains synchronizing information so the satellite demodulator (not shown) can recover the burst. The body contains two, eight or sixteen data packets, corresponding to transmission rates of 512 kbps, 2 Mbps, and 16 Mbps, respectively.

Under normal operating conditions (i.e., no fading), an ST within coverage area 315 transmits at a maximum rate of 512 kbps, 2 Mbps, and 16 Mbps. However, in the presence of fading, a 2 Mbps ST may switch down to a 512 kbps channel. Similarly, an ST transmitting at 512 kbps may switch down to a 128 kbps fall-back channel. The 128 kbps mode (or fall-back mode) uses eight slots per frame instead of 32 slots per frame, with two data packets per burst. All transmission rates use Offset QPSK modulation; filtering is 25 percent raised root cosine. The 128 kbps transmission rate is intended as a mechanism to reduce the uplink rate during poor propagation conditions to improve link availability.

In an exemplary embodiment, the satellite may have 224 active uplink demodulators (not shown). Each uplink demodulator supports the equivalent of three 16 Mbps channels. Each 16 Mbps channel can be configured as a single 16 Mbps channel or eight 2 Mbps channels. Likewise, if the uplink demodulator is configured for eight 2 Mbps channels, each of the eight channels can be utilized as a single 2 Mbps channel or four 512 kbps channels. Thus, the capacity of the satellite is 21,504 channels if all the channels are configured as 512 kbps.

The communication system 300 supports two types of uplink channels: (1) contention channels, and (2) data channels. An uplink channel can be configured as either a contention channel or a data channel at any given time, but not both simultaneously Contention channels are used by an ST for bandwidth allocation requests to the BCP 305 in the satellite. Bandwidth allocations are made periodically by the BCP 305. After making its allocations, the BCP 305 transfers any totally unallocated data channels to the contention channels. Allocations are packed into a downlink multicast to all ST in each uplink beam. This multicast also provides notification of any additional contention channels, above the already configured contention channels, which are available to the ST in the beam.

The service areas 315 and 317 are covered by a set of polygons that are fixed on the surface of the earth. Downlink polygons, called microcells, are hexagonal in shape as viewed from the spacecraft, with seven microcells clustered together to form an uplink polygon, called a cell. As used herein, the term microcell is used synonymously with the term downlink cell. The satellite generates a set of uplink circular beams that each encloses a cell. It also generates a set of downlink beams that each encloses a microcell.

Downlink packet bursts to individual microcells are transmitted with sufficient power to just close the link to an ST within the microcell. In addition, there is a "cellcast" mode that is used to transmit system-level information to all STs within an uplink cell when there are no rain fades in the cell. The transmit power to the center microcell is increased sufficiently to close the link to STs in any of the seven microcells within the uplink cell.

Polarization is employed to maximize the system capacity. The polarization is fixed, as are the satellite beams that serve the cells. Adjacent cells or cells that are separated by less than one cell diameter of the same polarization must split the spectrum; that is, such cells cannot use the same frequencies. However, adjacent cells on opposite polarization can use the same frequencies. The downlink beam operates on two polarizations simultaneously so that the frequency reuse ratio is 2:1. A total of 24 transmitters, 12 on RHC (Right-Hand Circular) polarization and twelve on the LHC (Left-Hand Circular) polarization serve the downlink cells. The transmitters serve all microcells by time hopping from microcell to microcell. With 24 transmitters, the theoretical frequency reuse ratio is 24:1.

Up to 12 downlink spot beams can be transmitted simultaneously on each polarization subject to minimum microcell separation distance limitations. Beams on the same polarization must be sufficiently separated spatially to avoid unacceptable co-channel interference. Another co-polarized beam is not allowed to transmit to another microcell within an ellipse or else excessive interference may occur. The "keep-out" areas apply separately and independently for the two polarizations; the link budgets account for any cross-polarization interference that may occur.

As shown in FIGS. 3A and 3B, on the downlink of communication system 300, at each TDMA transmission slot, the downlink scheduler 309 selects up to n bursts of packets from M virtual queues of the packet buffer 307 to transmit through n transmitters, based on the scheduling algorithm and transmission constraint checks. The scheduling algorithm, in an exemplary embodiment, is a round-robin scheme. Because the downlink scheduler 309 may not be able to find n bursts to transmit most of the time due to transmission constraints, downlink transmission capacity is greatly limited by transmission constraints. The downlink congestion in communication system 300 occurs when the amount of traffic admitted to the switch 302 exceeds the capacity of the downlink. In other words, if the BCP 305 made uplink allocations simply based on the availability of uplink slots, the BCP 305 would sometimes admit more traffic to a particular downlink cell (i.e., destination site) or cluster of mutually-interfering microcells than the downlink can carry. Consequently, the data packets for these areas would completely fill the packet buffer 307 in the payload's switch 302, resulting in dropped packets. Therefore, the availability of both uplink slots and downlink bandwidth factor into bandwidth allocations that is performed by the BCP 305.

The main transmission constraint in communication system 300 is the interference constraint; that is, two simultaneous downlink transmissions cannot be performed if they are directed at downlink cells which are within a system limit interference distance. In FIG. 3B, because downlink cells A, B and C in coverage area 317 are outside the system limit interference distances (as shown by the overlapping circles) from one another, the satellite can simultaneously transmit packets to these downlink cells A, B and C. However, simultaneous transmission cannot be directed to downlink cells D and A, downlink cell D and B, downlink cell E and B and downlink cell E and C since they are within the system limit interference distance. That is, these downlink cells are in the same circle.

To illustrate the downlink capacity limitation of the system 300 stemming from transmission constraints (in particular, interference constraints), a scenario in which there are packets in the virtual queues of packet buffer 307 that are destined only to downlink cells A, B, C, D and E is considered. It should be noted that without any constraint, there can be five transmissions at one TDMA slot; however, with the interference constraint, only a maximum of three transmissions at one TDMA slot is possible (to downlink cells A, B, and C). If the satellite is to transmit to downlink cell D or downlink cell E, there can be at most two transmissions only, either to downlink cells D and C or to downlink cells E and A.

Figure 4:
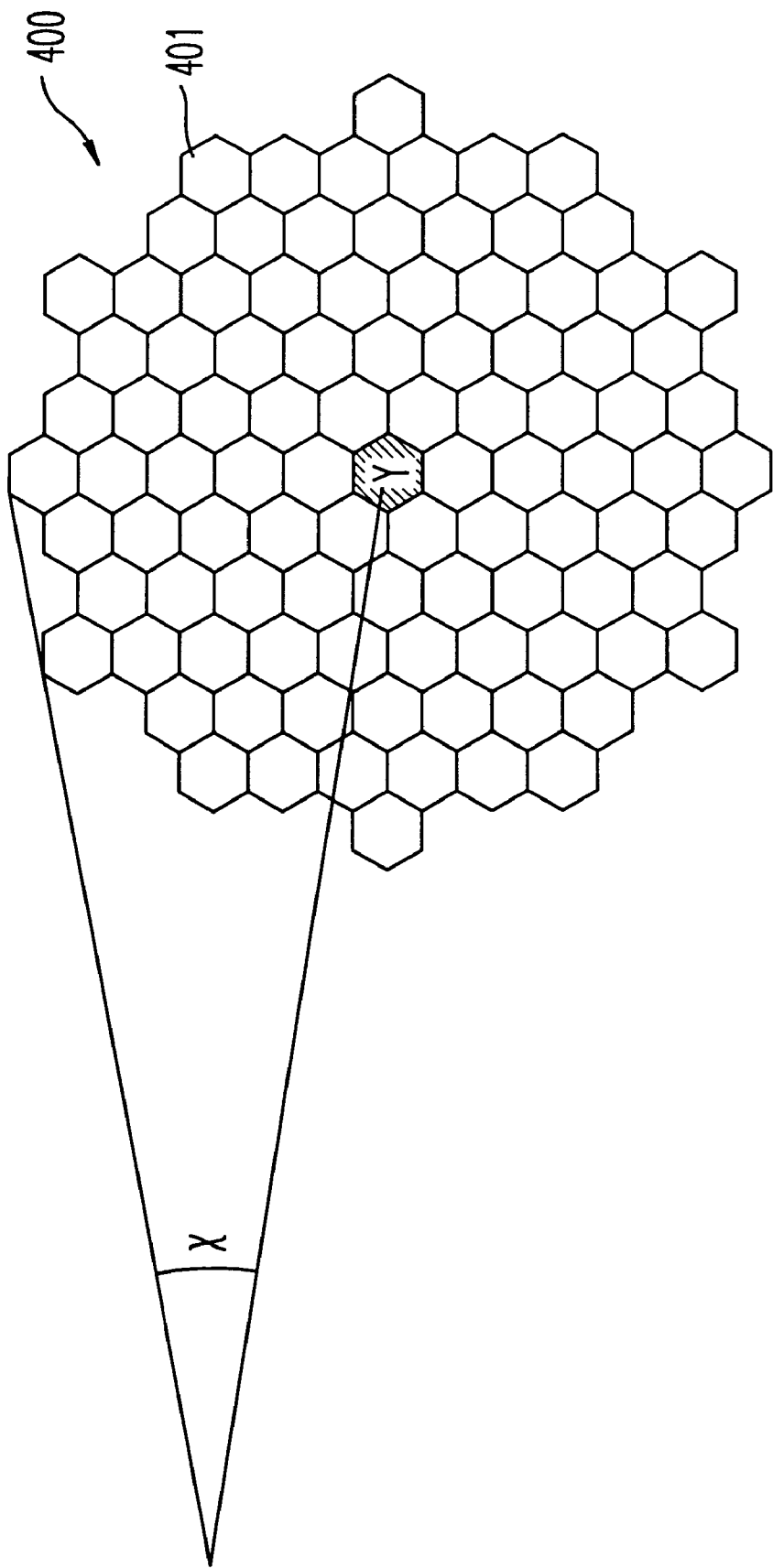
FIG. 4 is a diagram of an interference region of a target downlink cell, in accordance with an embodiment of the present invention.

FIG. 4 shows a diagram of an interference region of a target downlink cell defined according to an embodiment of the present invention. An interference region 400 includes a target downlink cell, which is surrounded by numerous downlink cells 401. Downlink cells 401 are clustered around target downlink cell Y within a radius that is determined by an angle x from a point of view of a satellite. The angle x can be set to any degree, depending on the coverage area and network application.

As will be discussed in more detail below, the BCP 305 and the congestion avoidance logic 304 limit the aggregate traffic going to a set of downlink cells, referred to as an "interference cluster," instead of limiting the traffic going to each individual downlink cells. An interference cluster is a maximal set of downlink cells that are within the system limit interference distance from one another. Since clusters are not mutually exclusive of one another, a downlink cell can belong to more than one cluster. As will be more fully discussed in FIGS. 5 and 6, the cluster-based congestion avoidance involves obtaining a cluster list and determining the cluster threshold. This information is then applied to reduce and/or prevent congestion.

Figure 5:
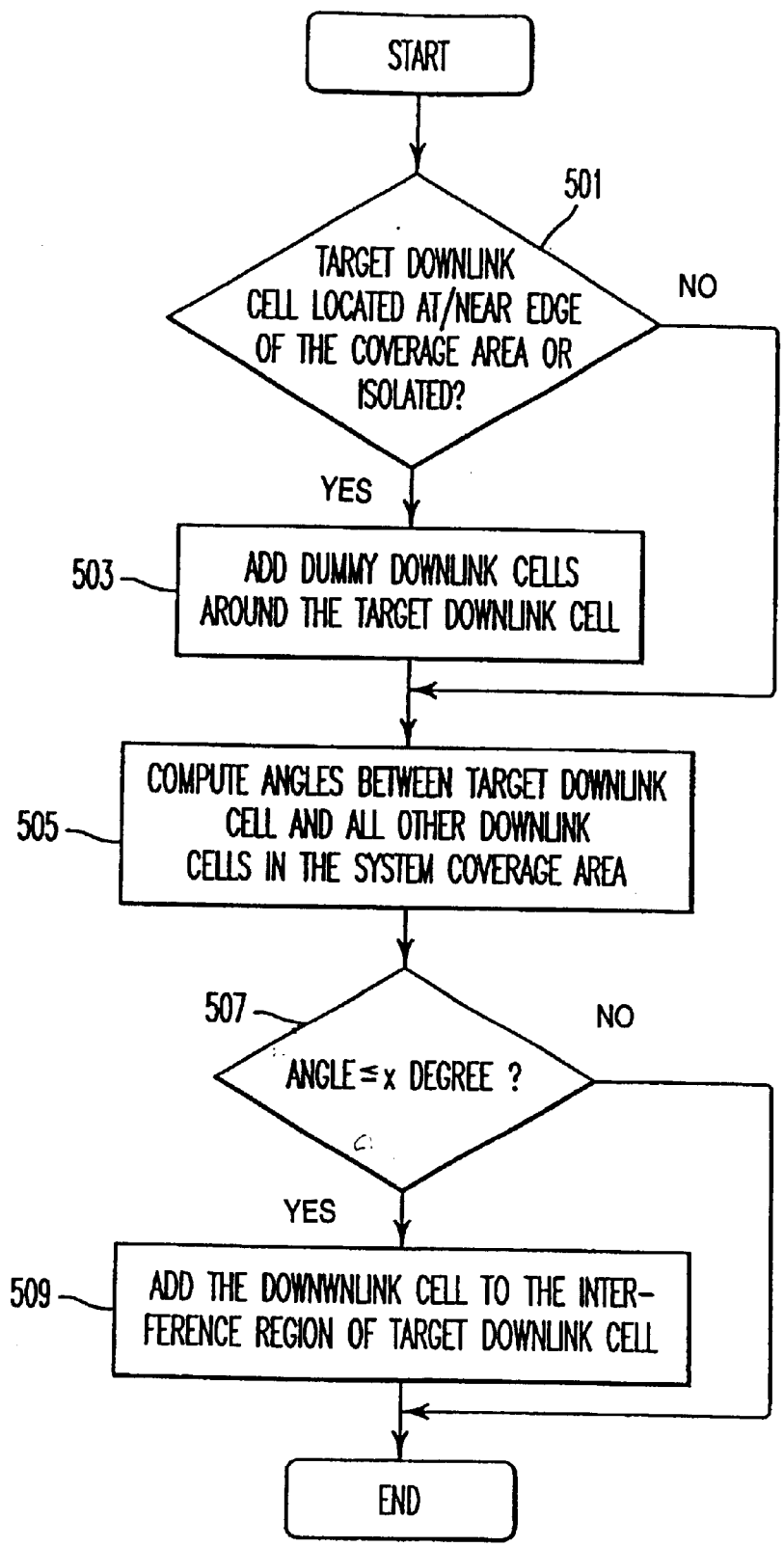
FIG. 5 is a flowchart of the process of determining the interference region of FIG. 4, in accordance with an embodiment of the present invention.

FIG. 5 shows a flowchart of a process for determining the interference region of FIG. 4. The transmission constraint of the system 300 dictates that simultaneous transmissions cannot be directed to any two downlink cells, which are within x degrees from each other, from the point of view of the satellite. In other words, if the satellite transmits to a target downlink cell, the satellite cannot transmit, at the same time, to any downlink cell around the target downlink cell that is within x degrees from the target downlink cell. The group of all the downlink cells, which are within x degrees from a target downlink cell, is defined as the interference region of the target downlink cell.

The interference region 400 of a downlink cell can be obtained by comparing angles between any two downlink cells from the point of view of the satellite. For computational efficiency, steps 501 and 503 are performed. In step 501, it is determined whether the target downlink cell is located at or near the edge of the coverage area or is isolated. If so, dummy downlink cells are added around the target downlink cell Y, per step 503. If the target downlink cell is not located near or at the edge of a coverage area or is not isolated, then the process continues to step 505. In step 505, the angles between the target downlink cell Y and all the downlink cells 401 in the system coverage area are computed by the congestion avoidance logic 304 based upon the positions of the downlink cells on the earth. The congestion avoidance logic 304 then compares the angles of downlink cells 401 to a predetermined angle x degrees from the target downlink cell Y, as in step 507. If the computed angle of a downlink cell is less than or equal to angle x, then the downlink cell is added to the interference region of the target downlink cell (step 509). On the other hand, if the angle is greater than x degrees, the particular cell is not included in the interference region. After the interference region 400 is determined, all the clusters are computed.

Figure 6:
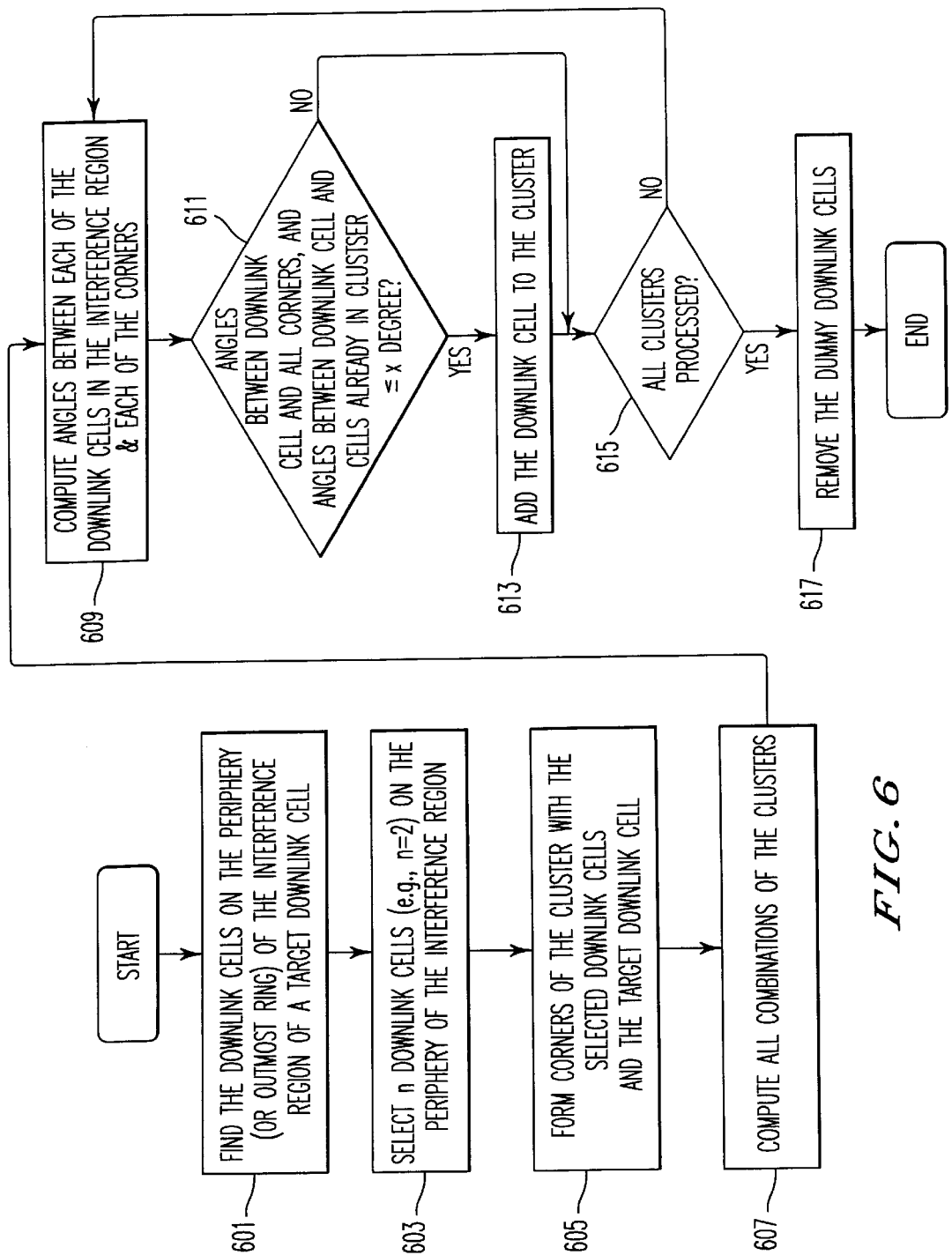
FIG. 6 is a flowchart of the process of determining interference clusters, in accordance with an embodiment of the present invention.

FIG. 6 shows a flowchart of the process of determining interference clusters, in accordance with an embodiment of the present invention. In step 601, the downlink cells along the periphery (or outermost ring) of the interference region of a target downlink cell is identified by the congestion avoidance logic 304. Next, in step 603 n downlink cells (e.g., n=2) of the downlink cells along the periphery of the interference region are selected. The corners of the cluster, as in step 605, are formed with the selected downlink cells and the target downlink cell. It is evident that several possible combinations of such corners can be formed with the target downlink cell Y. Accordingly, all the combinations of the clusters are computed (step 607). For each of the combinations, the angles between each of the downlink cells in the interference region and each of the corners are computed, per step 609. In step 611, the angle between the downlink cell and all the end corners and all the downlink cells that are already in the cluster, is checked to determine whether the angle is less than or equal to x degrees. If the determination is in the affirmative, the downlink cell is added to the cluster, per step 613. Next, in step 615 it is determined whether all the clusters have been processed; if not, step 609 as well as the ensuing steps are repeated. If all the clusters have been processed, step 617 removes the dummy downlink cells, if any, that were introduced in the process of generating the interference region.

A complete list of interference clusters is formed by combining all the clusters obtained from the interference region of each downlink cell in the coverage area. Since some clusters are repeated and some clusters are subsets of some other clusters in this cluster list, the final cluster list can be obtained by eliminating redundant and repeated clusters from the initial list. There can be thousands of possible clusters in the system 300. If processing power is not limited, the complete list of all possible clusters can be used for congestion avoidance. The generation of this list of all possible clusters need only be performed just once, assuming the interference constraints are static and fixed.

However, if processing power is limited, a "critical" cluster list can be generated, which includes a subset of clusters from the complete list, focusing only on those clusters that are likely to be highly congested. Congestion avoidance is required only for a few clusters (on the critical cluster list) with aggregate traffic load high enough to potentially cause congestion on the satellite. A critical cluster list can be generated based on historical data of downlink cell traffic loads and the distribution of receiving capacity of receivers over the coverage area 317. Such a critical cluster list can be dynamically updated, when the distribution of downlink cell traffic load obtained from historical data changes. If a critical cluster list is employed, only the downlink cells, which belong to the critical cluster list, have to be checked for congestion avoidance; all the remaining downlink cells are waived from congestion avoidance checks.

After generating the cluster list, whether a complete cluster list or a critical cluster list, a cluster threshold is determined. A cluster threshold is the amount of traffic, which can be transmitted to all the downlink cells in a cluster in one TDMA slot, discounted by some factor. The discount factor is used to account for peak-to-average ratio of aggregate offered traffic load to the clusters. Only one single cluster threshold is required, which can be applied to all the clusters in the cluster list. If preferential treatment is required for some clusters, more than one cluster threshold can be used for different clusters.

Figure 7B:
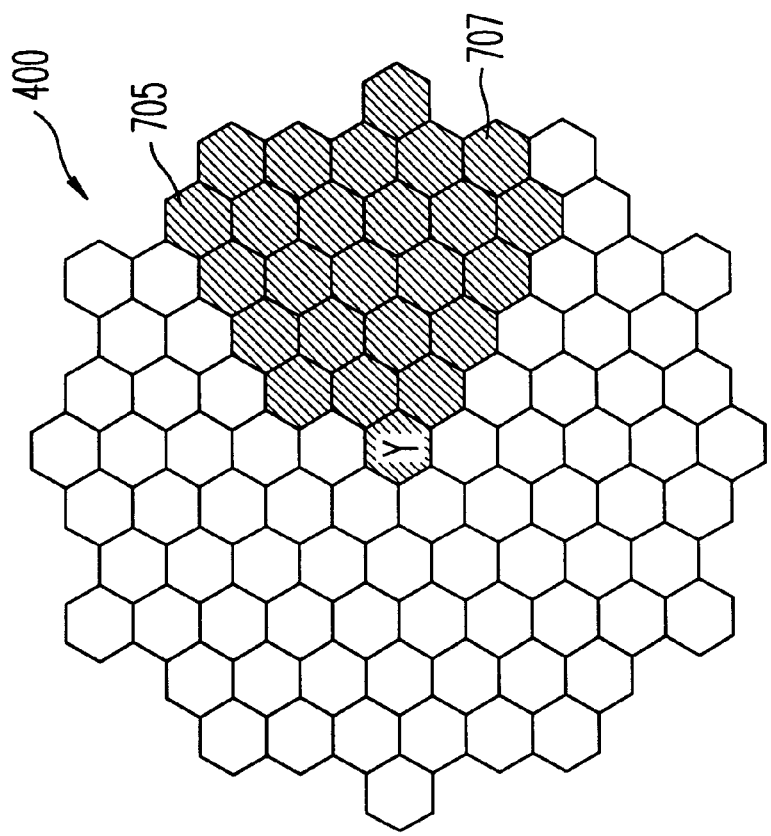
FIGS. 7A and 7B are diagrams of two exemplary interference clusters generated using the process of FIG. 6.
Figure 7A:
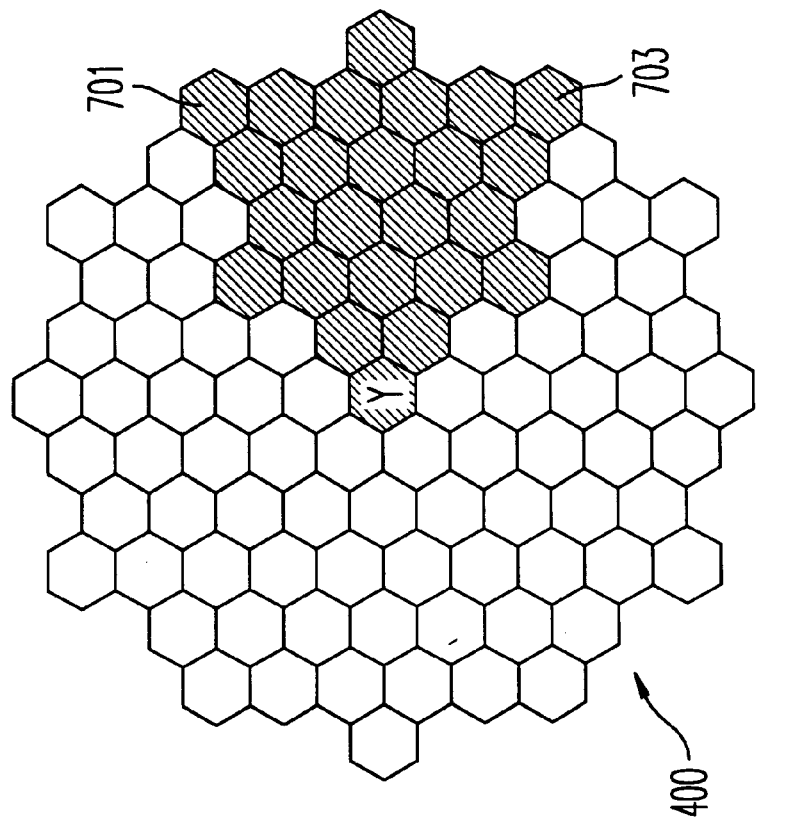

FIGS. 7A and 7B show two exemplary interference clusters, in which n is equal to 2. As shown in FIG. 7A, with n equals 2, the interference cluster is triangular, in which the corner downlink cells are 701 and 703. FIG. 7B shows a slightly different triangular shape than that of FIG. 7A, because the corner downlink cells were chosen to be downlink cells 705 and 707.

Figure 8A:
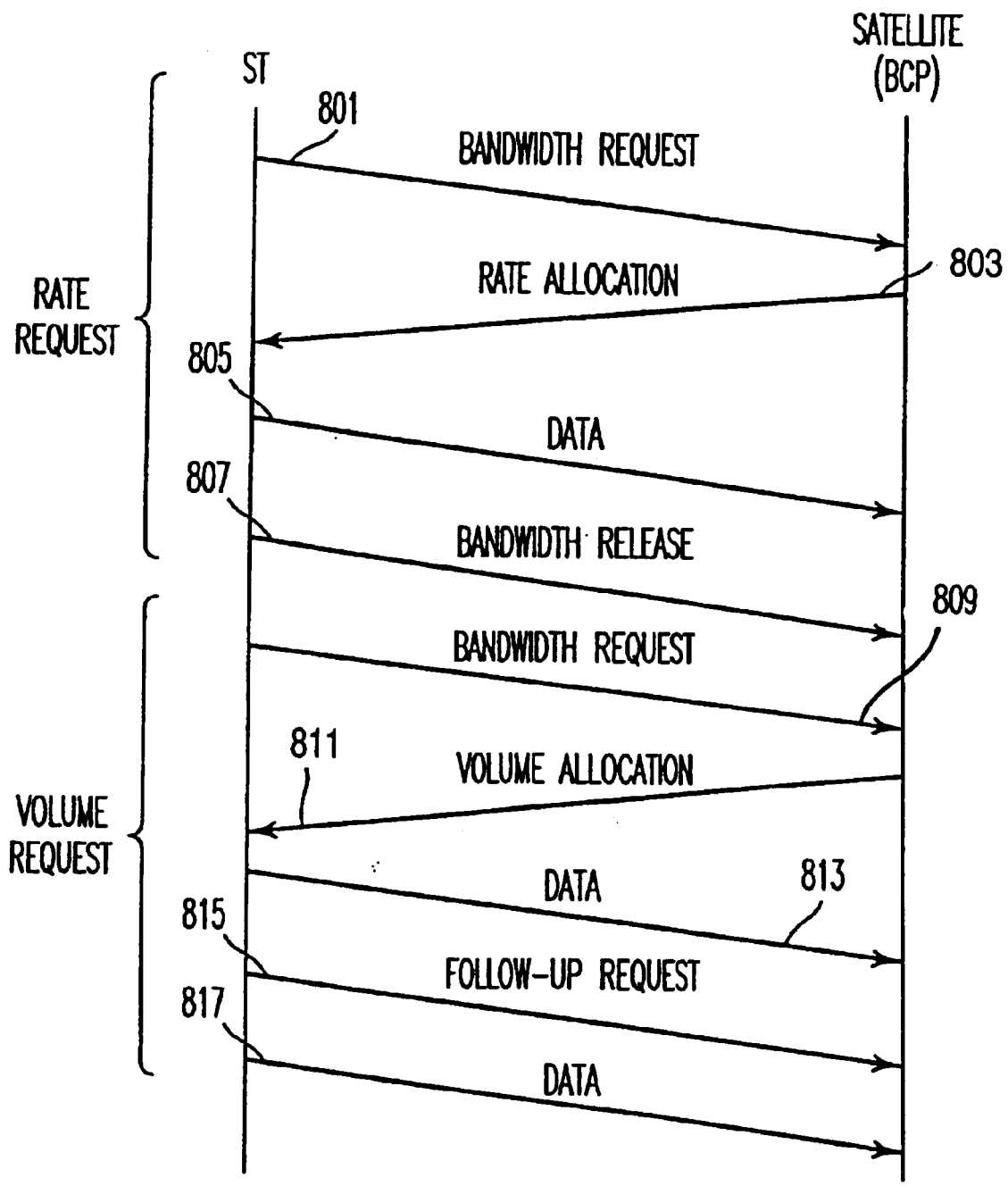

FIG. 8A shows a timing diagram of the bandwidth request operation, in accordance with an embodiment of the present invention. Before discussing the details of the bandwidth request and allocation operation, it is instructive to define the various types of bandwidth requests that are used in the communication system 300. According to one embodiment of the present invention, two types of requests are defined: rate requests, and volume requests. In general, rate requests are utilized for connection-oriented traffic, while volume requests are used to transmit bursty traffic.

In particular, rate requests specify the number of slots in each uplink frame that an ST needs to meet the uplink demands for a relatively constant traffic (e.g., connection oriented). A rate request results in the allocation of a constant number of slots each frame, spread out as evenly in time as possible, which the ST can use to send packets at a constant rate. Each frame has 32 slots, except for 128 kbps fall-back channels, which have 8 slots. A rate request specifies from 1 to 32 slots per frame (1 to 8 during fall-back mode). A full 16 MB, 2 MB, or 512 kbps user requests all 32 slots, a 8 MB, 1 MB, or 256 kbps ST requests 16 slots, etc., per frame. The requesting ST gets a constant allocation of that uplink capacity every frame until the request is cancelled by the ST via a de-allocation message to the satellite.

Volume requests specify the number of uplink slots that an ST requires to send a specific number of packets to another ST. The requesting ST receives a periodic allocation of one or many slots within a specific frame until the entire number of slots requested has been allocated. Volume requests are used by the ST to send a burst (one or many) of data packets on the uplink. Several volume requests may be transmitted by the ST in a short period of time to send a file that has hundreds of data packets (e.g., segmented IP (Internet Protocol) packets) to another ST.

Turning now to FIG. 8A, the bandwidth request operation is performed by an ST that transmits data using a rate request during one session and a volume request during another session. In step 801, a station terminal (ST) transmits a bandwidth request packet to the satellite over a contention channel. Based on the current traffic load, the BCP 305 may dynamically assign some of the 512 kbps uplink channels on a frame-by-frame basis to change the designation of these uplink channels from data channels to contention channels. Thus, when the traffic on the 512 kbps data channels is light, the BCP 305 can assign most of the 512 kbps data channels to be used as contention channels, thereby reducing the collision rate for contention accesses by the STs. In other words, as traffic on data channels increases, the BCP 305 can change contention channels into data channels, as appropriate. This advantageously permits a more efficient use of satellite capacity, in that as the load increases, fewer channels are dedicated to receiving new bandwidth request packets.

Upon receiving the bandwidth request packet and after determining that bandwidth is available, the satellite, per step 803, sends a rate allocation every frame to provide the ST with a fixed number of time slots that the ST can transmit into that frame. Specifically, the BCP 305 allocates uplink slots in response to bandwidth requests from STs in each uplink beam (i.e., downlink cell) once every 96 ms frame and sends rate allocations to the STs in these downlink cells once per frame using allocation packets. Sending rate allocations every frame allows the BCP 305 to move rate allocation slots within a channel or to another channel to "defragment" the rate allocations.

As indicated previously, according to one embodiment, the BCP 305 packs allocations for several STs into each allocation packet to preserve downlink bandwidth. The BCP 305 addresses allocation packets to a dedicated multicast group address so that these packets can be processed by all of the STs in the downlink cell that are waiting for slot allocations. These STs process every allocation packet that they receive to find the ones that contain their own destination addresses and their corresponding allocations.

Rate requests, according to an embodiment of the present invention, are acknowledged by the BCP 305 in one of two ways, rate allocation within an allocation packet or rate denied within an acknowledgement packet. The formats of both of these packets is shown in FIGS. 9B and 9C, respectively. If an ST receives a request denied response to a rate request, the ST notifies the NOC, which then determines the course of action. Rate requests are de-allocated (released) by the ST when the ST has completed its transmission. Rate de-allocated messages from the ST are not acknowledged by the BCP 305. The ST monitors the multicast allocation message from the BCP 305 to determine that the rate was de-allocated. The NOC can also de-allocate a rate request for an ST.

The size of rate requests can be increased or decreased by sending a rate change request specifying a different number of slots per frame. The change request is sent using an allocation from the original rate request. If the rate change is granted the ST receives an allocation for the new rate within a multicast allocation packet. If the rate change is denied, the ST receives a multicast acknowledgement packet indicating the denial. The BCP 305 does not de-allocate the original rate request until the BCP 305 has successfully processed and allocated the changed rate request.

An ST that does not receive a multicast packet with its allocation (due to a rain fade, etc.) cannot transmit. The ST must wait until a multicast is received that specifies the allocation to resume transmission.

Successive rate allocations provide the ST with the same number of time slots in a frame; however, the channel and slot locations for that allocation may be changed. Upon receiving the rate allocation, the ST can begin transmitting data, per step 805. Thus, an ST may send a packet burst into a timeslot on a data channel only if the ST has sent a request packet to the BCP 305 and has received an allocation from the BCP 305 authorizing the ST use of specific timeslots on a particular channel. It should be noted that the data channels experience no collisions because the BCP 305 only allocates a timeslot on a data channels to a single ST. The rate allocation remains until the ST sends a bandwidth release packet (step 807). Initial bandwidth requests for a rate allocation are typically sent on a contention channel. However, the release packet, which de-allocates a rate, can be sent within the rate allocation that is being de-allocated.

The same ST can also initiate a volume request during another session. Original volume requests are sent to the BCP 305 via a contention channel (per step 809); alternatively, these requests may be "piggybacked" and sent using an allocation reserved for the ST (such as an unused rate slot). Acknowledgements to bandwidth requests are used to ensure that requesting ST receive a timely response to reduce the number of re-requests on contention channels. In response to a volume request made on a contention channel the BCP 305, as in step 811, sends either an acknowledgement or allocation to the requesting ST in a multicast acknowledgement or allocation packet. If the ST times out, the ST assumes a collision has occurred on the contention channel and sends another request. Upon receiving the allocation, the ST begins transmitting data (step 813). If the ST has additional data to send, follow-up volume requests are sent to the BCP 305 using an allocation from the original or previous follow-up request (step 815). Follow-up requests are not acknowledged by the BCP 305.

As evident from the above discussion an ST can use volume requests to send large amounts of data on the uplink and, by the use of "follow-up" requests, almost continuously send data for a long period of time. For example, the ST can initiate an original volume request for uplink bandwidth by sending a message on the uplink on a contention channel for a number of slots required to transmit data packets. If the ST receives additional data for the same data stream before the initial request has been completely metered out, a follow-up volume request can be made by sending an in-band message using a slot allocation of the previous request. The follow-up request is for the number of slots required for data packets for which a request has not been made (including the packet for the data displaced by the follow-up). The maximum number of slots allowed to be requested in a single volume request is configurable by a NOC (e.g., 1600 slots). Data continues to be transmitted, per step 817.

Figures 1, 8B:
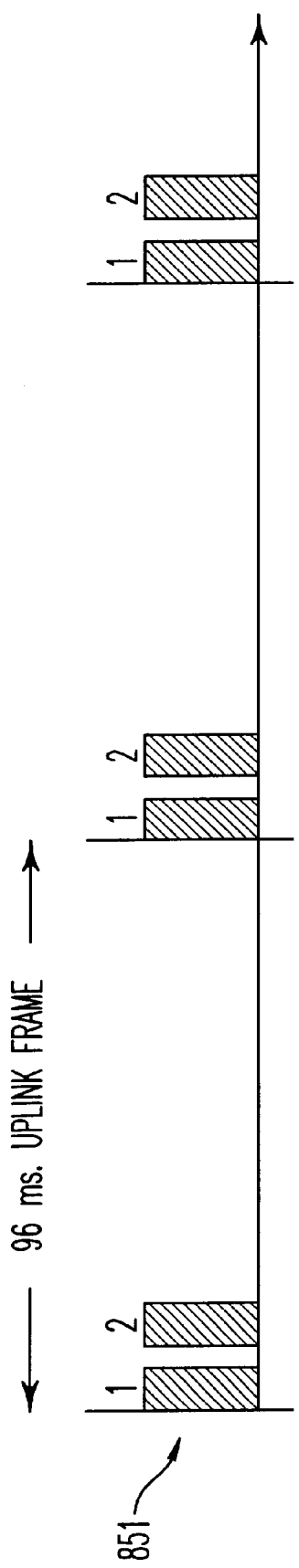
Figures 2, 8B:
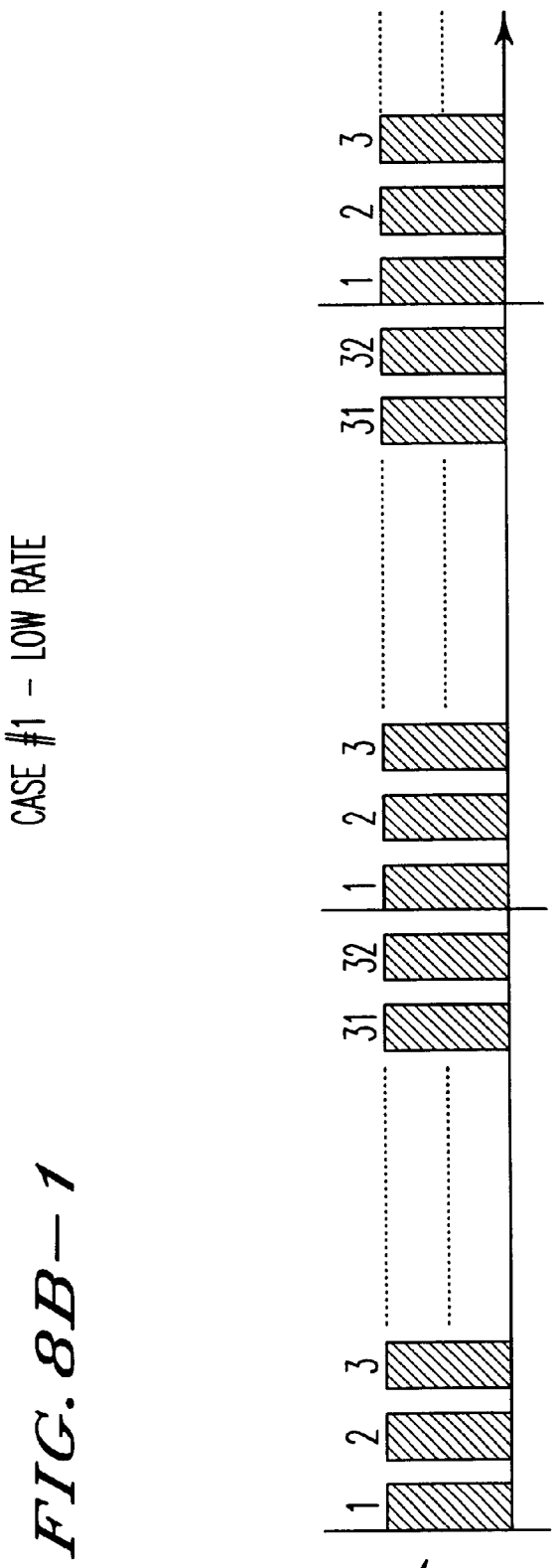

FIG. 8B shows the rate allocation within the TDMA frame, in accordance to an embodiment of the present invention. As discussed in FIG. 8A, STs send bandwidth request packets over contention channels to the BCP 305 when the STs seek an allocation of timeslots on a reserved uplink channel. STs can request two types of allocations, rate and volume. The BCP 305 sends a rate allocation every frame to supply an ST a fixed number of timeslots that the ST can transmit into for that particular frame. Successive rate allocations give an ST the same number of transmit slots in a frame, but the channel and slot locations for the allocation may change.

Examples of two ST data burst patterns, in response to rate allocations from the BCP 305, are shown in FIG. 8B. In diagram 851, the ST has requested a low rate from the BPC 305. In this case, the ST has been allocated two transmission slots in each frame, timeslots 1 and 2, on a particular channel. If the allocation is for a 512 kbps channel, two timeslots per frame allows the ST to transmit four data packets in each 96 ms frame. This corresponds to a user information rate of about 32 kbps. As seen in diagram 853, the ST has been allocated all 32 timeslots in every frame on a particular channel. If the allocation is for a 512 kbps channel, this corresponds to a user information rate of about 512 kbps.

FIG. 8C shows examples of volume allocations from the BCP 305. A volume allocation gives an ST permission to transmit into specified timeslots on a specified channel. STs request volume allocations when they have a specific number of data packets that the STs seek to deliver for connectionless packet delivery service. Diagram 855 shows that the ST has been allocated 13 bursts in contiguous timeslots on a specified channel. The allocations straddle an uplink frame boundary 857. If this is a 512 kbps channel allocation, the ST will be able to send 13 bursts containing a total of 26 data packets. With respect to diagram 859, the ST has been allocated timeslots in three consecutive frames. There is a rate allocation (shown in white) to another ST on this channel, so the volume allocation (shown in black) is interspersed with the rate allocation over multiple frames.

FIGS. 9A–9C show a bandwidth request packet, an allocation packet, and an acknowledgement packet, respectively, in accordance with an embodiment of the present invention. As in FIG. 9A, a request packet 900 includes the following fields: a destination address field 901; an uplink rate field 903; a request type field 905; a rate request field 907; a destination downlink field 909; and a request priority field 911. The destination address field 901 specifies the requesting ST's destination address. The uplink rate field 903 indicates the uplink rate; e.g., 128 kbps, 512 kbps, 2 Mbps, or 16 Mbps. The request type field 905 indicates whether the request is a rate or volume allocation. The rate request field 907 permits the ST to specify the requested rate or number of time slots requested. The destination downlink field 909 specifies the downlink cell where the packets in the requested slots are to be sent. The request priority field 911 allows the ST to indicate whether the request is a low or high priority. The satellite processes low priority requests, for example, only if there are slots remaining after all high priority requests have been filled.

As seen in FIG. 9B, the allocation packet 920 contains individual rate and volume allocations with the following information: an ST source address field 921, a rate/number of slots field 923, and a last allocation of request field 925 (meaningful for volume requests only). The address field 921 stores the address of the requesting ST. The rate/number of slots field 923 indicates the requested rate (i.e., number of slots in the frame for a given channel). The field 925 pertains only to volume requests, and specifies whether this is the last allocation.

The acknowledgement packet 940, as in FIG. 9C, contains individual acknowledgements or denials with the following fields: an ST source address field 941, a request ID 943, and a type field 945. The ST source address field 941 is the same as field 921 of the allocation packet. The request ID (identification) field 943 indicates a particular request for the ST, so that in a volume request, the potentially numerous follow-up requests can be properly managed. The type field 945 specifies that the BCP 305 is denying the request.

Figure 10:
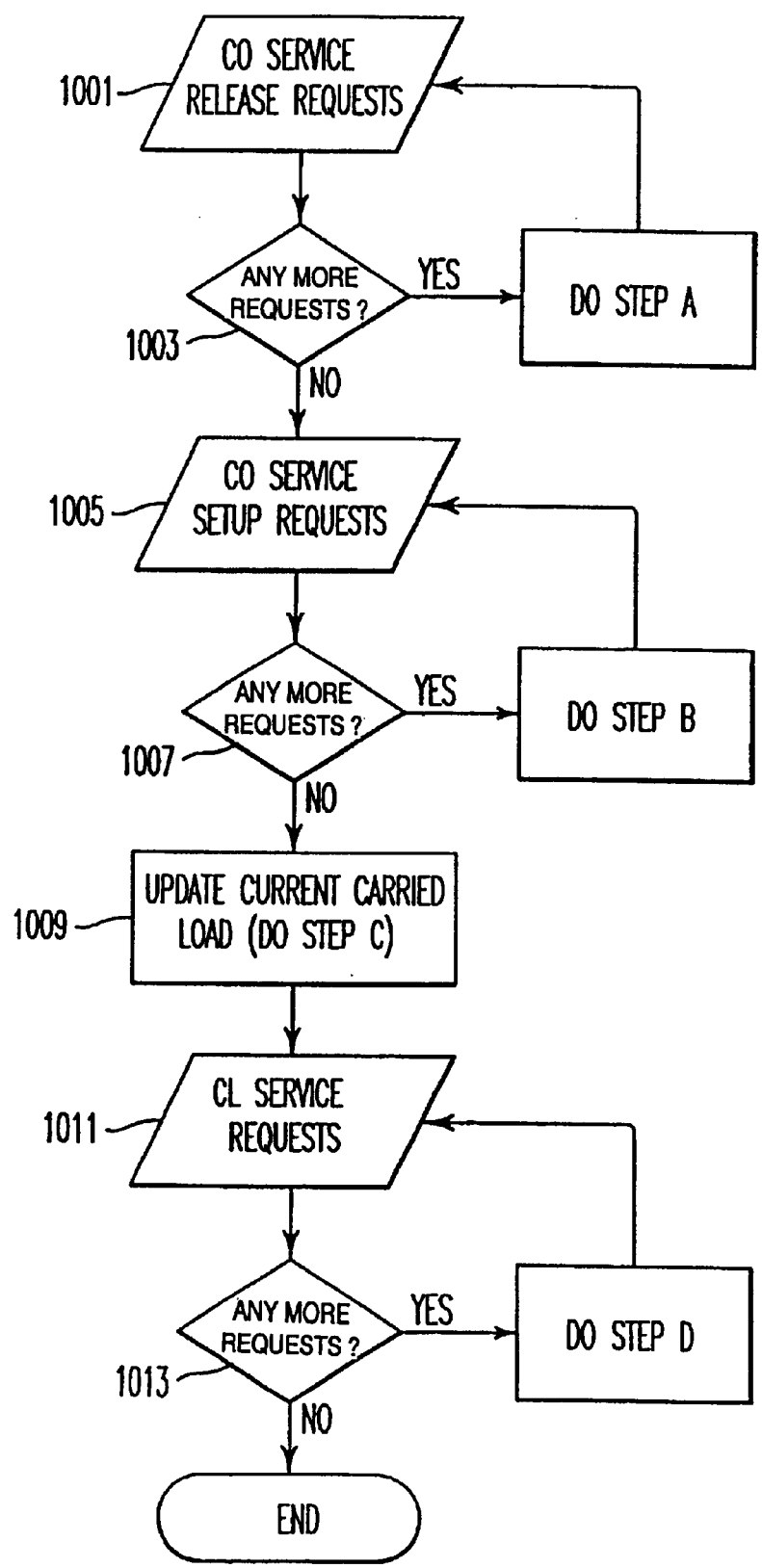
FIG. 10 is a flowchart of the congestion avoidance operation, in which a complete cluster list is used, according to an embodiment of the present invention.

FIG. 10 shows a flowchart of the congestion avoidance operation, utilizing a complete cluster list, in accordance with an embodiment of the present invention. The satellite payload 301 (FIG. 3A) accumulates bandwidth requests for a predefined period before the bandwidth control processor 305 starts processing the requests. In communication system 300, there are two basic types of traffic: Connection-Oriented (CO) traffic and ConnectionLess (CL) traffic. Consequently, there are two types of requests: requests for CO service and requests for CL service. Further, requests for CO service can be either for session setup or session release, while request for CL service is requesting bandwidth for one time use. Because CO traffic is given priority over CL traffic in resource allocation in communication system 300, CO service requests are considered for bandwidth allocation before CL service requests.

In step 1001, the BCP 305 examines the CO service release requests, and determines the destination address, type of request and amount of bandwidth release. Thereafter, BCP 305 sends such information to the congestion avoidance logic 304. Next, the BCP 305 determines whether any more CO service release requests exist, per step 1003. If there are CO service release requests, step A as shown in FIG. 11 is performed.

Figure 11:
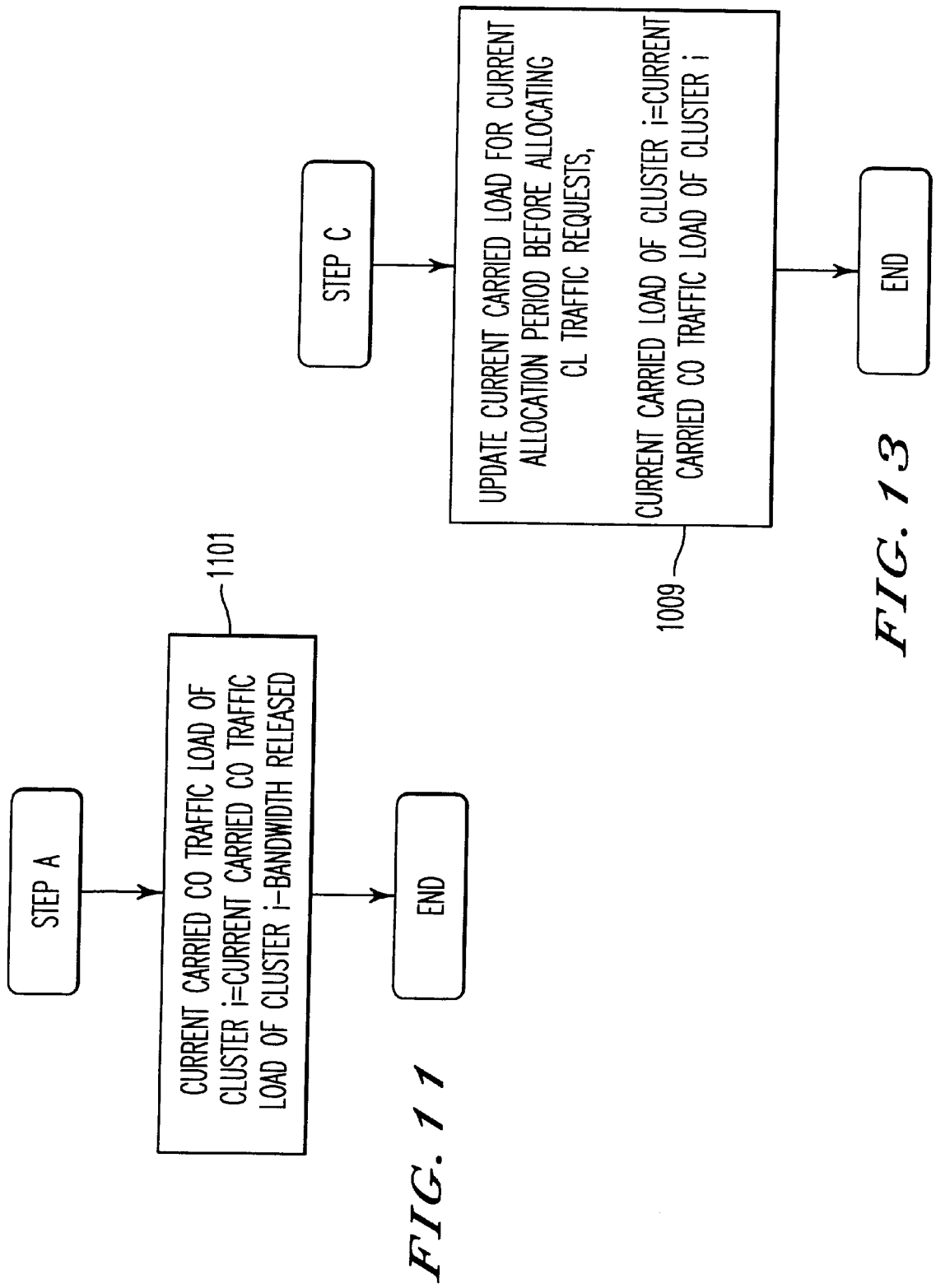
FIG. 11 is a flowchart of a release request process in the congestion avoidance operation, according to an embodiment of the present invention.

Turning to FIG. 11, for each session release request for CO traffic, and for all cluster i in the cluster list that the destination of the request belongs, step 1101 is performed by the congestion avoidance logic 304. In step 1101, the current carried CO traffic load of cluster i is determined by subtracting the bandwidth that is released, according to the following equation:

$$\text{Current carried CO traffic load of cluster } i = \text{Current carried CO traffic load of cluster } i - \text{bandwidth released} \quad \text{Eq. (1).}$$

The process of FIG. 10 continues with the bandwidth control processor 305 checking whether any CO service setup requests exist to determine the destination address, type of request and amount of bandwidth requested, per steps 1005 and 1007. If there are CO service setup requests to be processed, step B is performed (FIG. 12).

Figure 12:
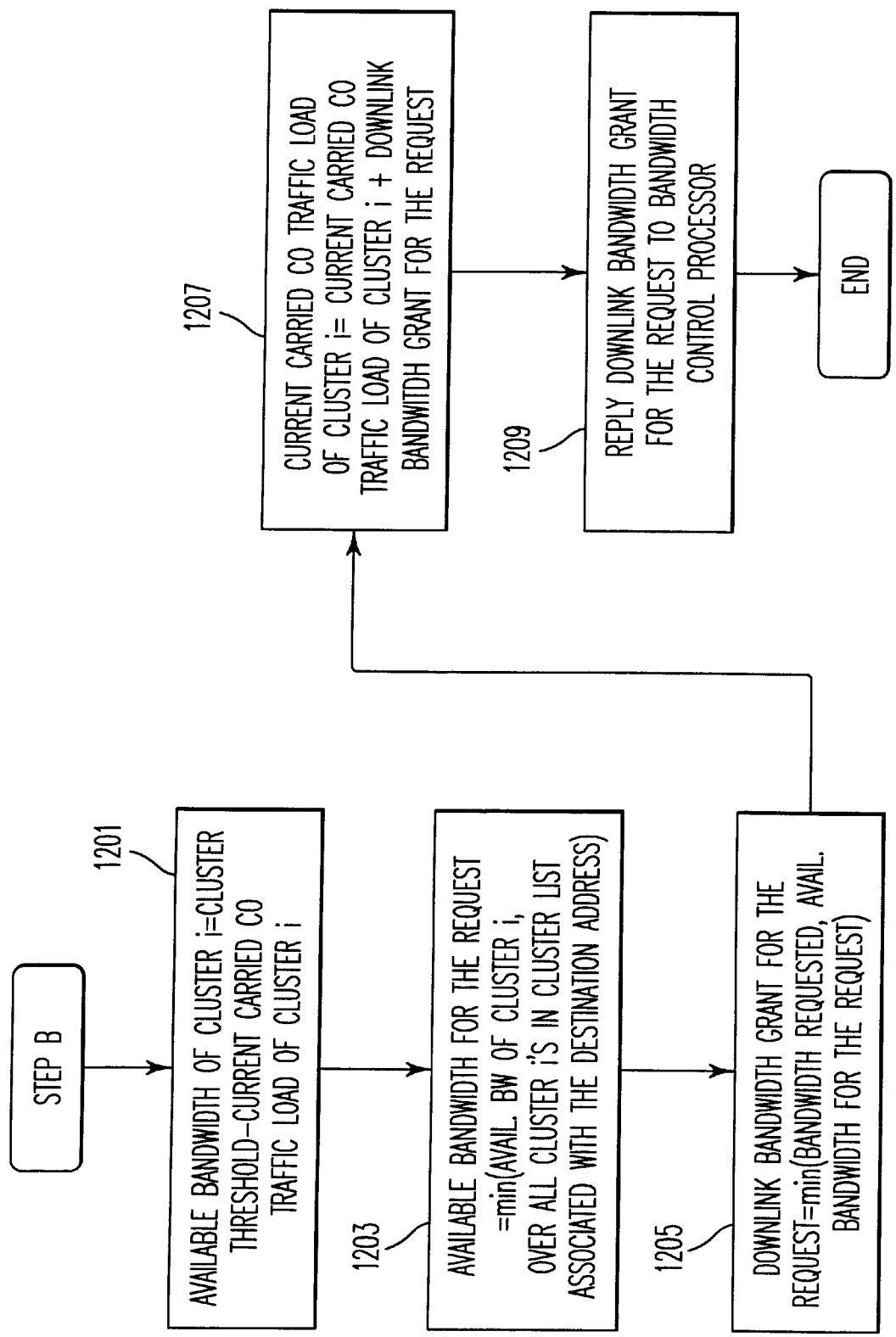
FIG. 12 is a flowchart of a setup request process in the congestion avoidance operation, according to an embodiment of the present invention.

Step B, as shown in FIG. 12, shows the flowchart of the session setup request process for CO traffic. In step 1201, for each cluster i in the cluster lists associated with the destination address of the request, the available bandwidth can be computed by the congestion avoidance logic 304 according to the equation shown below:

$$\text{Available bandwidth of cluster } i = \text{cluster threshold} - \text{current carried CO traffic load of cluster } i \quad \text{Eq (2).}$$

Next, the available bandwidth for the request is determined, per step 1203, according to equation (3):

$$\text{Available bandwidth for the request} = \min \text{ (available bandwidth of cluster } i, \text{ over all cluster } i\text{'s in the cluster list associated with the destination address)} \quad \text{Eq. (3).}$$

Effectively, Eq. (3) reveals that the available bandwidth for the request is set to the minimum bandwidth of a cluster in which messages are to be sent. In step 1205, the downlink bandwidth that is to be granted for the particular bandwidth request is computed by the congestion avoidance logic 304 according to equation (4):

$$\text{Downlink bandwidth grant for the request} = \min(\text{bandwidth requested, available bandwidth for the requests}) \quad \text{Eq. (4).}$$

The downlink bandwidth that is granted is based upon examining the minimum of the bandwidth requested according to the bandwidth request packet and the actual available bandwidth for the request; the bandwidth is set to the lesser of these two parameters. Next, in step 1207, for all cluster i's in the cluster list associated with the destination address, the current carried CO traffic load of the cluster is computed by the congestion avoidance logic 304 as follows:

$$\text{Current carried CO traffic load of cluster } i = \text{current carried CO traffic load of cluster } i + \text{downlink bandwidth grant for the request} \quad \text{Eq. (5).}$$

Thereafter, the bandwidth control processor 305 replies to the bandwidth request packet with the downlink bandwidth grant (step 1209).

Turning back to the congestion avoidance process of FIG. 10, the next step is to update the current carried load, per step 1009. As shown in FIG. 13, step 1009 provides the update of the current carried load for the current allocation period before allocating CL traffic requests. For each cluster i in the cluster list, the current carried load of cluster i is computed by the congestion avoidance logic 304 as follows:

$$\text{Current carried load of cluster } i = \text{current carried CO of traffic load of cluster } i \quad \text{Eq. (6).}$$

In step 1011 (FIG. 10), the bandwidth control processor 305 examines the CL service request to determine the following information: destination address, type of request, and amount of bandwidth requested. If there are no such requests, per step 1013, then the process of congestion avoidance is complete. However, if there are CL service requests to be processed step D is performed.

Figure 14:
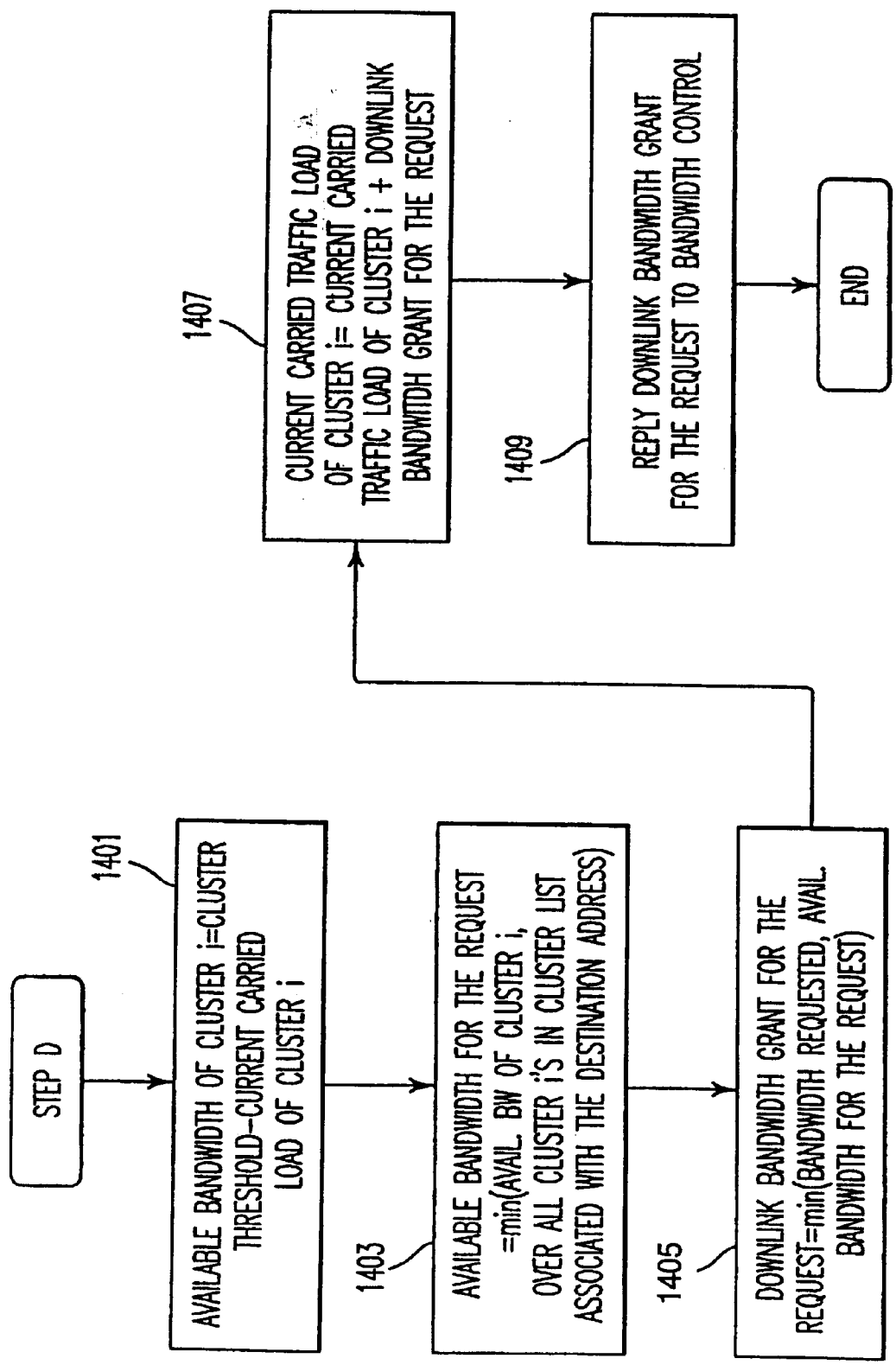
FIG. 14 is a flowchart of congestion avoidance operation involving CL traffic, according to an embodiment of the present invention.

FIG. 14 shows the process involved with step D, related to the treatment of bandwidth requests for CL traffic. In step 1401, for each cluster i in the cluster lists associated with the destination address, Eq. (7) is computed as follows:

$$\text{Available bandwidth of cluster } i = \text{cluster threshold} - \text{current carried traffic load of cluster } i \quad \text{Eq (7).}$$

Next in step 1403, the available bandwidth of the request is computed according to Eq. (3). In step 1405, the downlink bandwidth grant for the request is computed according to Eq. (4). Next, the current carried traffic load of cluster i, per step 1407, is computed by the congestion avoidance logic 304 as follows:

$$\text{Current carried traffic load of cluster } i = \text{current carried traffic load of cluster } i + \text{downlink bandwidth grant for the request} \quad \text{Eq. (8).}$$

In step 1409, the congestion avoidance logic 304 replies with the downlink bandwidth grant for the request to the bandwidth control processor 305.

Figure 15:
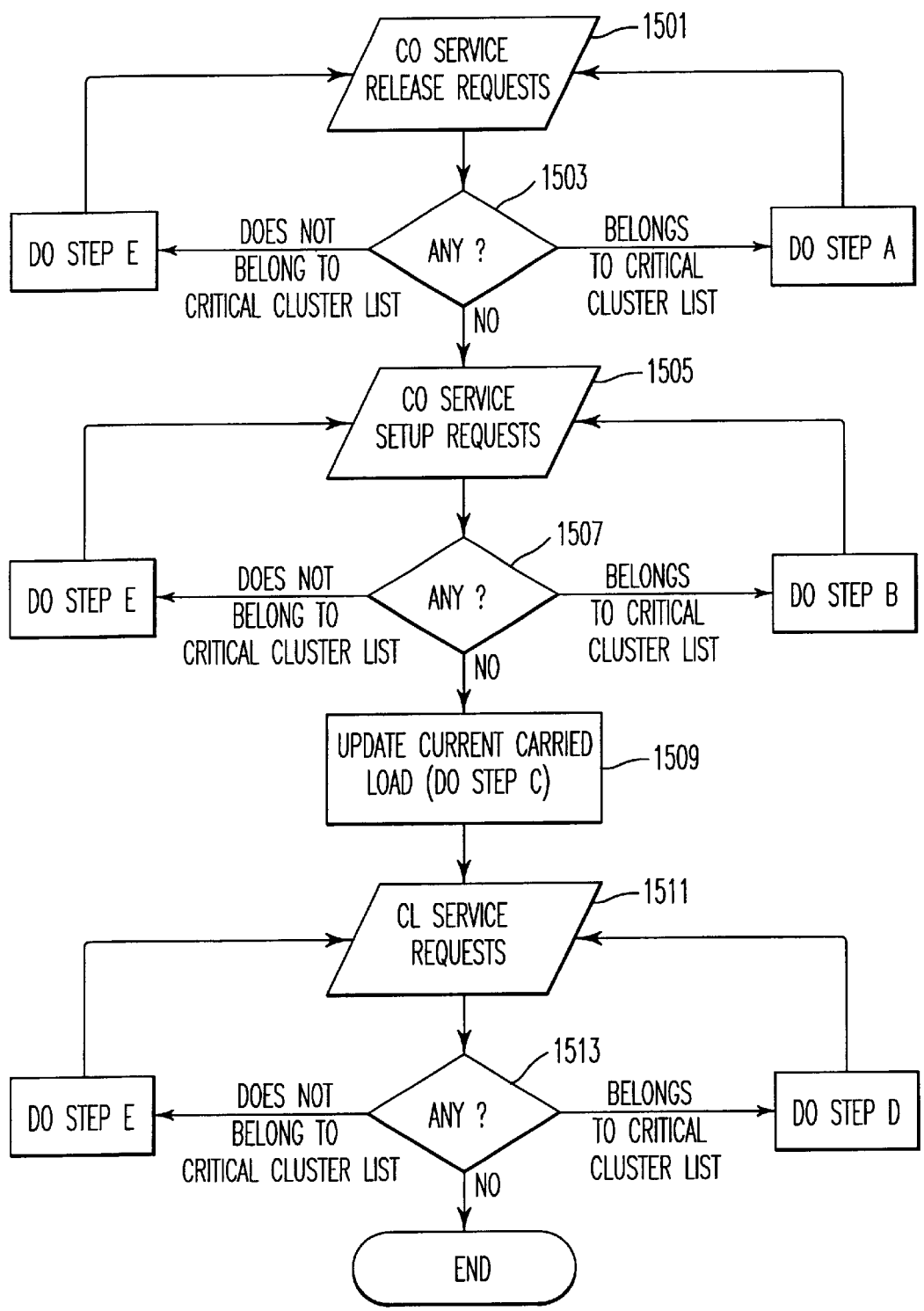
FIG. 15 is a flowchart of the congestion avoidance operation, in which a critical cluster list is used, according to an embodiment of the present invention.

FIG. 15 shows a flowchart of the congestion avoidance operation, utilizing a critical cluster list according to an embodiment of the present invention. The process of FIG. 15 is similar to the process of FIG. 10 for handling a complete cluster list. In particular, the steps 1501, 1505, 1509, and 1511 correspond to steps 1001, 1005, 1009, and 1011, respectively of FIG. 10. The process of FIG. 15, however, provides an additional step (step E) upon determination that if the destination address of the bandwidth request is not a part of the critical cluster list, per steps 1503, 1507, and 1513, step E is performed.

Figure 16:
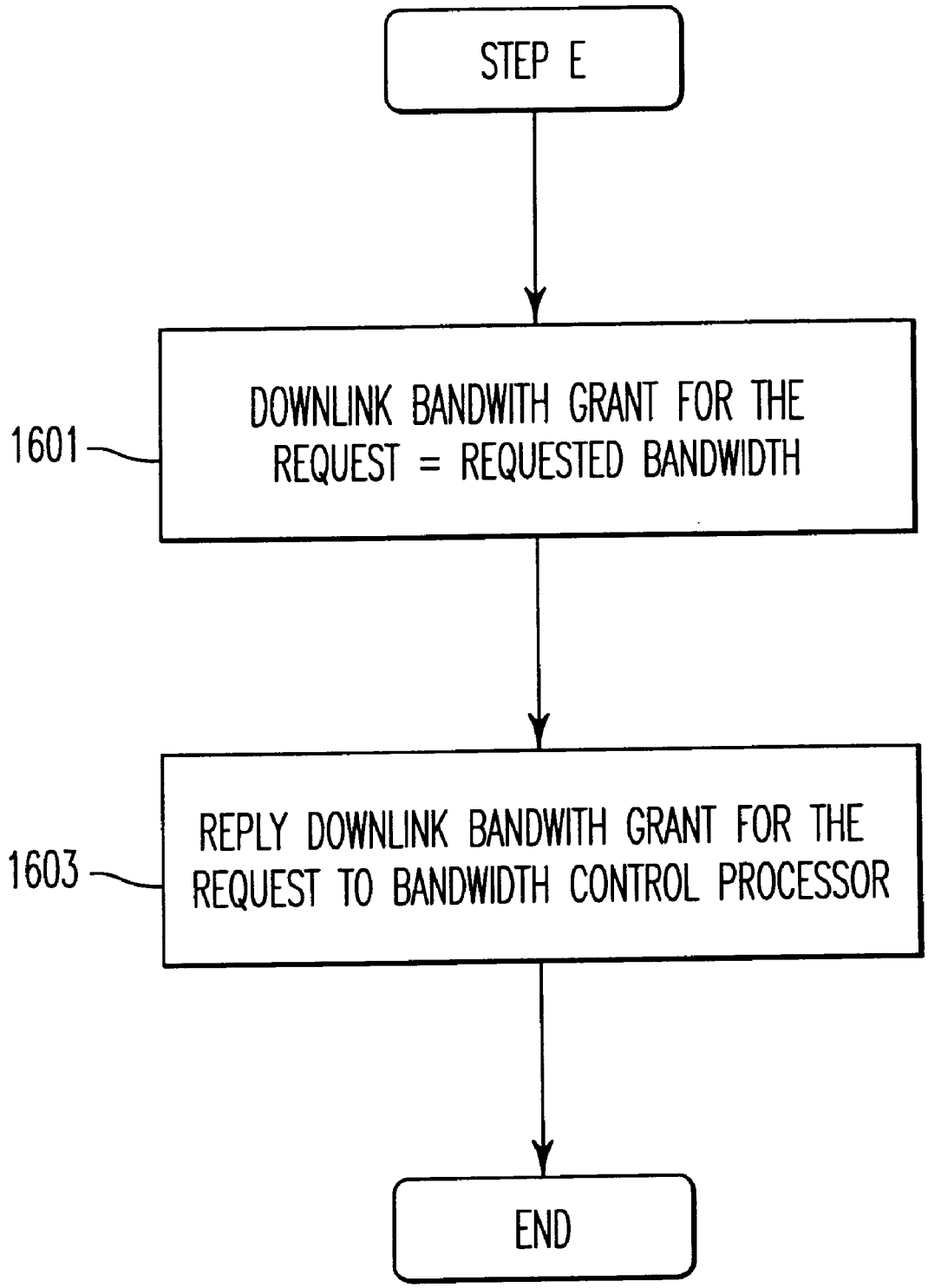
FIG. 16 is a flowchart of congestion avoidance operation of FIG. 15, in which the destination address of the request is not a part of the cluster list, according to an embodiment of the present invention.

FIG. 16 shows the details of step E, which is performed when it is determined that the destination address of the request does not belong to the critical cluster list. As a result, the downlink bandwidth grant for the request is set equal to the requested bandwidth, per step 1601. Next in step 1603, the congestion avoidance logic 304 replies with a downlink bandwidth grant for the request to bandwidth control processor 305.

Based on the cluster list and the cluster threshold, the congestion avoidance logic 304 controls traffic by interacting with the BCP 305. It should be noted that congestion avoidance, alternatively, can be performed at the NOC. All the required parameters to congestion avoidance, such as the cluster list and the cluster threshold, can be set and updated by the system operator of the NOC.

Figure 17:
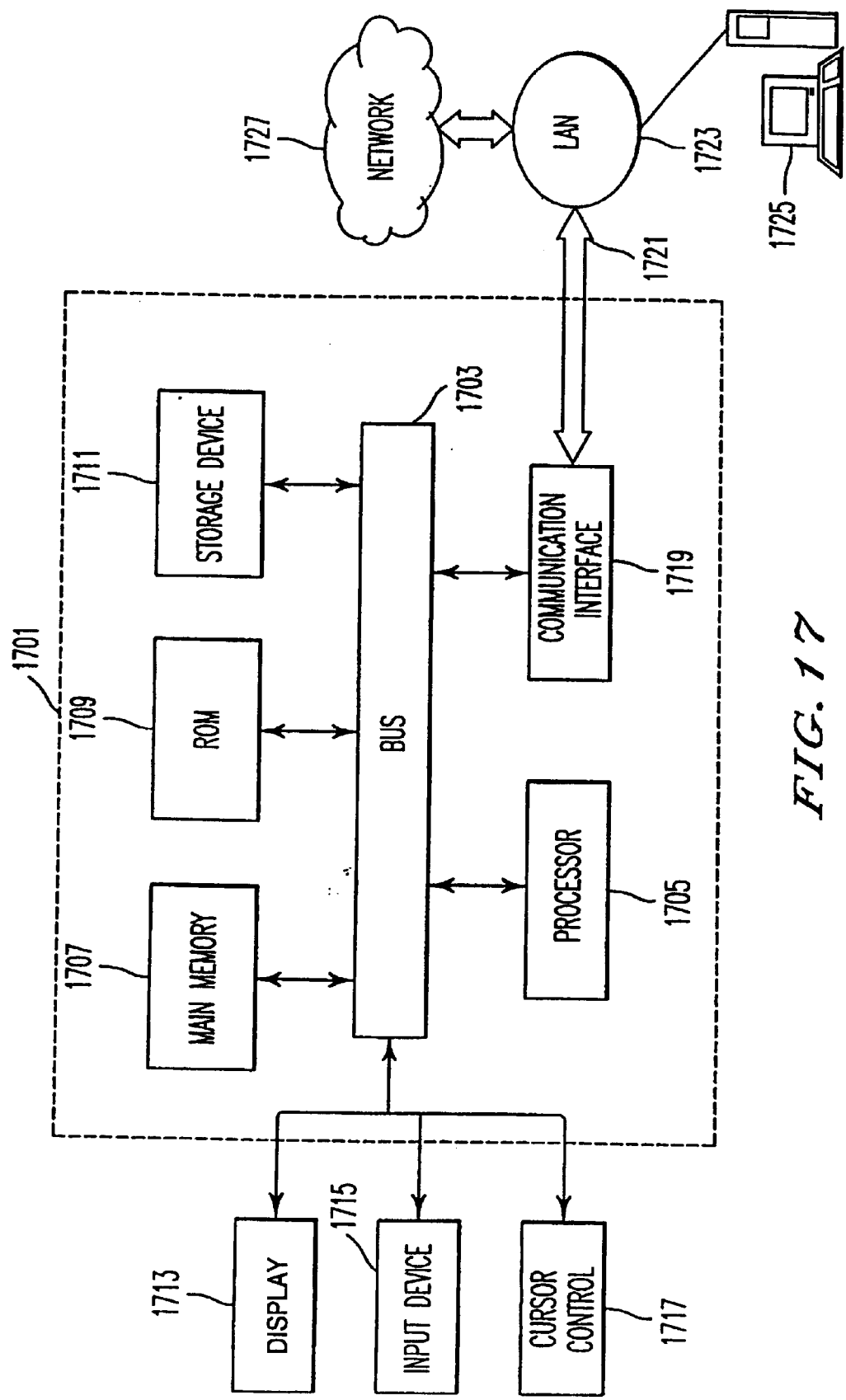
FIG. 17 is a diagram of a computer system that can perform the bandwidth control functions to avoid congestion, in accordance with an embodiment of the present invention.

FIG. 17 illustrates a computer system 1701 upon which an embodiment according to the present invention may be implemented to perform congestion avoidance. Computer system 1701 includes a bus 1703 or other communication mechanism for communicating information, and a processor 1705 coupled with bus 1703 for processing the information. Computer system 1701 also includes a main memory 1707, such as a random access memory (RAM) or other dynamic storage device, coupled to bus 1703 for storing information and instructions to be executed by processor 1705. In addition, main memory 1707 may be used for storing temporary variables or other intermediate information during execution of instructions to be executed by processor 1705. Computer system 1701 further includes a read only memory (ROM) 1709 or other static storage device coupled to bus 1703 for storing static information and instructions for processor 1705. A storage device 1711, such as a magnetic disk or optical disk, is provided and coupled to bus 1703 for storing information and instructions.

Computer system 1701 may be coupled via bus 1703 to a display 1713, such as a cathode ray tube (CRT), for displaying information to a computer user. An input device 1715, including alphanumeric and other keys, is coupled to bus 1703 for communicating information and command selections to processor 1705. Another type of user input device is cursor control 1717, such as a mouse, a trackball, or cursor direction keys for communicating direction information and command selections to processor 1705 and for controlling cursor movement on display 1713.

According to one embodiment, the execution of the steps in FIGS. 10–16 is provided by computer system 1701 in response to processor 1705 executing one or more sequences of one or more instructions contained in main memory 1707. Such instructions may be read into main memory 1707 from another computer-readable medium, such as storage device 1711. Execution of the sequences of instructions contained in main memory 1707 causes processor 1705 to perform the process steps described herein. One or more processors in a multi-processing arrangement may also be employed to execute the sequences of instructions contained in main memory 1707. In alternative embodiments, hard-wired circuitry may be used in place of or in combination with software instructions. Thus, embodiments are not limited to any specific combination of hardware circuitry and software.

Further, the congestion avoidance mechanism of the present invention may reside on a computer-readable medium. The term "computer-readable medium" as used herein refers to any medium that participates in providing instructions to processor 1705 for execution. Such a medium may take many forms, including but not limited to, non-volatile media, volatile media, and transmission media. Non-volatile media includes, for example, optical or magnetic disks, such as storage device 1711. Volatile media includes dynamic memory, such as main memory 1707.

Transmission media includes coaxial cables, copper wire and fiber optics, including the wires that comprise bus 1703. Transmission media can also take the form of acoustic or light waves, such as those generated during radio wave and infrared data communication.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1705 for execution. For example, the instructions may initially be carried on a magnetic disk of a remote computer. The remote computer can load the instructions relating to the notification services to control call processing remotely into its dynamic memory and send the instructions over a telephone line using a modem. A modem local to computer system 1701 can receive the data on the telephone line and use an infrared transmitter to convert the data to an infrared signal. An infrared detector coupled to bus 1703 can receive the data carried in the infrared signal and place the data on bus 1703. Bus 1703 carries the data to main memory 1707, from which processor 1705 retrieves and executes the instructions. The instructions received by main memory 1707 may optionally be stored on storage device 1711 either before or after execution by processor 1705.

Computer system 1701 also includes a communication interface 1719 coupled to bus 1703. Communication interface 1719 provides a two-way data communication coupling to a network link 1721 that is connected to a local network 1723. For example, communication interface 1719 may be a network interface card to attach to any packet switched local area network (LAN). As another example, communication interface 1719 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 1719 sends and receives electrical, electromagnetic or optical signals that carry digital data streams representing various types of information.

Network link 1721 typically provides data communication through one or more networks to other data devices. For example, network link 1721 may provide a connection through local network 1723 to a host computer 1725 or to data equipment operated by a service provider, which provides data communication services through a communication network 1727 (e.g., the Internet). LAN 1723 and network 1727 both use electrical, electromagnetic or optical signals that carry digital data streams. The signals through the various networks and the signals on network link 1721 and through communication interface 1719, which carry the digital data to and from computer system 1701, are exemplary forms of carrier waves transporting the information. Computer system 1701 can transmit notifications and receive data, including program code, through the network (s), network link 1721 and communication interface 1719.

The techniques described herein provide several advantages over prior approaches to avoiding traffic congestion. A bandwidth control processor 305 in conjunction with a congestion avoidance logic 304 controls the traffic arriving at the input to the switch by limiting the aggregate traffic going to a cluster. A cluster list is generated based upon the transmission constraints of the switch. The cluster-based congestion avoidance mechanism of the present invention takes into account the clusters and a cluster threshold. This approach advantageously provides a low complexity solution for controlling congestion at the switch. Another advantage is that this arrangement does not require use of additional overhead bits, thereby optimizing system throughput.

Obviously, numerous modifications and variations of the present invention are possible in light of the above teachings. It is therefore to be understood that within the scope of the appended claims, the invention may be practiced otherwise than as specifically described herein.

What is claimed is:

1. A method of performing congestion avoidance in a switching system having a plurality of input ports and a plurality of output ports, the method comprising:

receiving a bandwidth request at one of the input ports;

generating a plurality of clusters based upon a transmission constraint associated with the output ports, each of the clusters designating a portion of a plurality of destination sites, wherein the destination sites are downlink cells and the transmission constraint specifies restriction of transmission to a portion of the downlink cells that are within a system limit interference distance, the generating step including, determining an interference region for each of the downlink cells in a coverage area, and determining the clusters within the interference region of a targeted one of the downlink cells;

generating a critical cluster list based upon traffic statistics of the downlink cells;

determining a cluster threshold corresponding to traffic load distribution among a portion of the plurality of clusters, each of the clusters specifying a maximal set of the downlink cells that conform with the transmission constraint;

selectively granting the bandwidth request based upon the step of determining the cluster threshold and the critical cluster list.

2. A method of performing congestion avoidance in a switching system having a plurality of input ports and a plurality of output ports, the method comprising:

receiving a bandwidth request at one of the input ports;

generating a plurality of clusters based upon a transmission constraint associated with the output ports, each of the clusters designating a portion of a plurality of destination sites, wherein the destination sites are downlink cells and the transmission constraint specifies restriction of transmission to a portion of the downlink cells that are within a system limit interference distance, the generating step including, determining an interference region for each of the downlink cells in a coverage area, computing a plurality of angles between the target downlink cell and remaining ones of the downlink cells in the coverage area, comparing the computed angles corresponding to the downlink cells with a predetermined angle, designating downlink cells to be in the interference region if the downlink cells have corresponding angles that are less than or equal to the predetermined angles, and determining the clusters within the interference region of a targeted one of the downlink cells;

determining a cluster threshold corresponding to traffic load distribution among a portion of the plurality of clusters, each of the clusters specifying a maximal set of the downlink cells that conform with the transmission constraint; and selectively granting the bandwidth request based upon the step of determining the cluster threshold.

3. The method according to claim 2, wherein the step of determining the interference region further comprises:

selectively designating dummy downlink cells around the target downlink cell based upon position of the target downlink cell within the coverage area.

4. A method of performing congestion avoidance in a switching system having a plurality of input ports and a plurality of output ports, the method comprising:

receiving a bandwidth request at one of the input ports;

generating a plurality of clusters based upon a transmission constraint associated with the output ports, each of the clusters designating a portion of a plurality of destination sites, wherein the destination sites are downlink cells and the transmission constraint specifies restriction of transmission to a portion of the downlink cells that are within a system limit interference distance the generating step including, determining an interference region for each of the downlink cells in a coverage area, and determining the clusters within the interference region of a targeted one of the downlink cells including, determining which of the downlink cells within the interference region are located on a periphery of the interference region, selecting a predetermined number of peripheral downlink cells to designate as being a part of the cluster, computing angles between each of the downlink cells within the interference region and each of the peripheral downlink cells, and designating a portion of the downlink cells within the interference region to be a part of the cluster if the angle between each of the downlink cells within the interference region and each of the peripheral downlink cells is less than or equal to the predetermined angle;

determining a cluster threshold corresponding to traffic load distribution among a portion of the plurality of clusters, each of the clusters specifying a maximal set of the downlink cells that conform with the transmission constraint; and selectively granting the bandwidth request based upon the step of determining the cluster threshold.

5. A method of performing congestion avoidance in a switching system having a plurality of input ports and a plurality of output ports, the method comprising:

receiving a bandwidth request at one of the input ports;

generating a plurality of clusters based upon a transmission constraint associated with the output ports, each of the clusters designating a portion of a plurality of destination sites, wherein the destination sites are downlink cells and the transmission constraint specifies restriction of transmission to a portion of the downlink cells that are within a system limit interference distance, the generating step including, determining an interference region for each of the downlink cells in a coverage area, and determining the clusters within the interference region of a targeted one of the downlink cells;

eliminating clusters that are redundant and duplicative;

generating a cluster list based upon the eliminating step;

determining a cluster threshold corresponding to traffic load distribution among a portion of the plurality of clusters, each of the clusters specifying a maximal set of the downlink cells that conform with the transmission constraint; and selectively granting the bandwidth request based upon the cluster list and the step of determining the cluster threshold.

6. The method according to claim 1, wherein the cluster threshold in the step of determining is based upon a Time Division Multiple Access (TDMA) slot.

7. The method according to claim 1, further comprising:

determining another cluster threshold, wherein the selectively granting step is based upon the plurality of cluster thresholds.

8. The method according to claim 5, wherein the bandwidth request in the receiving step is at least one of a connection-oriented (CO) request and a connectionless (CL) request.

9. The method according to claim 8, further comprising:

determining a destination address associated with the bandwidth request;

determining whether the bandwidth request is the CO request or the CL request, wherein the CO request has a higher priority than the CL request, the CO request being at least one of a CO session release request and a CO session setup release request; and determining an amount of desired bandwidth.

10. The method according to claim 9, further comprising:

accumulating a plurality of bandwidth requests;

processing the CO session release requests;

processing the CO session setup requests; and processing the CL requests.

11. The method according to claim 10, wherein the step of processing the CO session release requests comprises:

releasing bandwidth allocations from the clusters within the cluster list having a downlink cell associated with the destination address.

12. The method according to claim 10, wherein the step of processing the CO session setup requests comprises:

determining available bandwidths of the clusters that have a downlink cell associated with the destination address based upon a difference between the cluster threshold and current traffic loads of the corresponding clusters; and computing available bandwidths for the CO session setup requests based upon the step of determining available bandwidths of the clusters, wherein each of the available bandwidths for the CO session setup requests is set to a minimum value of the available bandwidths of the clusters, wherein the step of selectively granting comprises allocating a granted bandwidth based upon a minimum of the requested bandwidth and the available bandwidth.

13. The method according to claim 10, wherein the step of processing the CL requests comprises:

determining available bandwidths of the clusters that have a downlink cell associated with the destination address based upon a difference between the cluster threshold and current traffic loads of the corresponding clusters; and computing available bandwidths for the CL service requests based upon the step of determining available bandwidths of the clusters, wherein each of the available bandwidths for the CL service requests is set to a minimum value of the available bandwidths of the clusters, wherein the step of selectively granting comprises allocating a granted bandwidth based upon a minimum of the requested bandwidth and the available bandwidth.

14. The method according to claim 1, wherein, in the step of generating, the destination sites are nodes and the transmission constraint specifies a routing limitation associated with simultaneous transmission to a portion the nodes.

15. The method according to claim 14, wherein each of the clusters in the determining step specifies a maximal set of the nodes that conform with the transmission constraint.

16. The method according to claim 10, wherein the step of selectively granting comprises allocating a granted bandwidth equal to the desired bandwidth if the destination address of the request does not correspond to a downlink cell within the cluster list.

17. A switching system comprising:
- a plurality of input ports, one of the input ports receiving a bandwidth request;
- a bandwidth control processor coupled to the plurality of input ports and configured to examine the bandwidth request;
- a plurality of output ports communicating with a plurality of destination sites; and
- a congestion avoidance logic configured to perform the steps of:
  - generating a plurality of clusters based upon a transmission constraint associated with the output ports, each of the clusters designating a portion of the plurality of destination sites, wherein the destination sites are downlink cells and the transmission constraint specifies restriction of transmission to a portion of the downlink cells that are within a system limit interference distance, the generating step including determining an interference region for each of the downlink cells in a coverage area and the clusters within the interference region of a targeted one of the downlink cells,
  - generating a critical cluster list based upon traffic statistics of the downlink cells,
  - determining a cluster threshold corresponding to traffic load distribution among a portion of the plurality of clusters, each of the clusters specifying a maximal set of the downlink cells that conform with the transmission constraint,
  - selectively granting the bandwidth request based upon the step of determining the cluster threshold and the critical cluster list.

18. A switching system comprising:
- a plurality of input ports, one of the input ports receiving a bandwidth request;
- a bandwidth control processor coupled to the plurality of input ports and configured to examine the bandwidth request;
- a plurality of output ports communicating with a plurality of destination sites; and
- a congestion avoidance logic configured to perform the steps of:
  - generating a plurality of clusters based upon a transmission constraint associated with the output ports, each of the clusters designating a portion of the plurality of destination sites, wherein the destination sites are downlink cells and the transmission constraint specifies restriction of transmission to a portion of the downlink cells that are within a system limit interference distance, the generating step including,
    - determining an interference region for each of the downlink cells in a coverage area and the clusters within the interference region of a targeted one of the downlink cells,
    - computing a plurality of angles between the target downlink cell and remaining ones of the downlink cells in the coverage area,
    - comparing the computed angles corresponding to the downlink cells with a predetermined angle, and
    - designating downlink cells to be in the interference region if the downlink cells have corresponding angles that are less than or equal to the predetermined angles;
  - determining a cluster threshold corresponding to traffic load distribution among a portion of the plurality of clusters, each of the clusters specifying a maximal set of the downlink cells that conform with the transmission constraint, and
  - selectively granting the bandwidth request based upon the step of determining the cluster threshold.

19. The system according to claim 18, wherein the congestion avoidance logic selectively designates dummy downlink cells around the target downlink cell based upon position of the target downlink cell within the coverage area.

20. A switching system comprising:
- a plurality of input ports, one of the input ports receiving a bandwidth request;
- a bandwidth control processor coupled to the plurality of input ports and configured to examine the bandwidth request;
- a plurality of output ports communicating with a plurality of destination sites; and
- a congestion avoidance logic configured to perform the steps of:
  - generating a plurality of clusters based upon a transmission constraint associated with the output ports, each of the clusters designating a portion of the plurality of destination sites, wherein the destination sites are downlink cells and the transmission constraint specifies restriction of transmission to a portion of the downlink cells that are within a system limit interference distance, the generating step including,
    - determining an interference region for each of the downlink cells in a coverage areas, and
    - determining the clusters within the interference region of a targeted one of the downlink cells including,
      - determining which of the downlink cells within the interference region are located on a periphery of the interference region,
      - selecting a predetermined number of peripheral downlink cells to designate as being a part of the cluster,
      - computing angles between each of the downlink cells within the interference region and each of the peripheral downlink cells and angles between each of the downlink cells within the interference region and each cell within the cluster, if any, and
      - designating a portion of the downlink cells within the interference region to be a part of the cluster if the angle between each of the downlink cells within the interference region and each of the peripheral downlink cells is less than or equal to the predetermined angle, determining a cluster threshold corresponding to traffic load distribution among a portion of the plurality of clusters, each of the clusters specifying a maximal set of the downlink cells that conform with the transmission constraint, and selectively granting the bandwidth request based upon the step of determining the cluster threshold.

21. A switching system comprising:

a plurality of input ports, one of the input ports receiving a bandwidth request;

a bandwidth control processor coupled to the plurality of input ports and configured to examine the bandwidth request;

a plurality of output ports communicating with a plurality of destination sites; and a congestion avoidance logic configured to perform the steps of:

generating a plurality of clusters based upon a transmission constraint associated with the output ports, each of the clusters designating a portion of the plurality of destination sites, wherein the destination sites are downlink cells and the transmission constraint specifies restriction of transmission to a portion of the downlink cells that are within a system limit interference distance, the generating step including determining an interference region for each of the downlink cells in a coverage area and the clusters within the interference region of a targeted one of the downlink cells, generating a cluster list by eliminating clusters that are redundant and duplicative, determining a cluster threshold corresponding to traffic load distribution among a portion of the plurality of clusters, each of the clusters specifying a maximal set of the downlink cells that conform with the transmission constraint, and selectively granting the bandwidth request based upon the cluster list and the step of determining the cluster threshold.

22. The system according to claim 17, wherein the cluster threshold is based upon a Time Division Multiple Access (TDMA) slot.

23. The system according to claim 17, wherein the congestion avoidance logic is configured to determine another cluster threshold.

24. The system according to claim 21, wherein the bandwidth request in the receiving step is at least one of a connection-oriented (CO) request and a connectionless (CL) request.

25. The system according to claim 24, wherein the bandwidth request includes a destination address and an amount of desired bandwidth, the bandwidth control processor configured to determine whether the bandwidth request is the CO request or the CL request, wherein the CO request has a higher priority than the CL request, the CO request being at least one of a CO session release request and a CO session setup release request.

26. The system according to claim 25, wherein the bandwidth control processor is configured to accumulate a plurality of bandwidth requests that include at least one of CO session release requests, CO session setup requests, and CL requests, the bandwidth control processor processing the bandwidth requests according to a prescribed order based upon a type of bandwidth request.

27. The system according to claim 26, wherein the congestion avoidance logic is configured to process the CO session release requests by releasing bandwidth allocations from the clusters within the cluster list having a downlink cell associated with the destination address.

28. The system according to claim 26, wherein the congestion avoidance logic is configured to process the CO session setup requests by determining available bandwidths of the clusters that have a downlink cell associated with the destination address based upon a difference between the cluster threshold and current traffic loads of the corresponding clusters, computing available bandwidths for the CO session setup requests based upon the determined available bandwidths of the clusters, wherein each of the available bandwidths for the CO session setup requests is set to a minimum value of the available bandwidths of the clusters, the congestion avoidance logic allocating a granted bandwidth based upon a minimum of the requested bandwidth and the available bandwidth.

29. The system according to claim 26, wherein the congestion avoidance logic is configured to process the CL requests by determining available bandwidths of the clusters that have a downlink cell associated with the destination address based upon a difference between the cluster threshold and current traffic loads of the corresponding clusters, and computing available bandwidths for the CL service requests based upon the step of determining available bandwidths of the clusters, wherein each of the available bandwidths for the CL service requests is set to a minimum value of the available bandwidths of the clusters, the congestion avoidance logic allocating a granted bandwidth based upon a minimum of the requested bandwidth and the available bandwidth.

30. The system according to claim 17, wherein the destination sites are nodes and the transmission constraint specifies a routing limitation associated with simultaneous transmission to a portion the nodes.

31. The system according to claim 30, wherein each of the clusters specifies a maximal set of the nodes that conform with the transmission constraint.

32. The system according to claim 26, wherein the congestion avoidance logic is configured to allocate a granted bandwidth equal to the desired bandwidth if the destination address of the request does not correspond to a downlink cell within the cluster list.

33. A computer-readable medium carrying one or more sequences of one or more instructions for performing congestion avoidance in a switching system having a plurality of input ports and a plurality of output ports, the one or more sequences of one or more instructions including instructions which, when executed by one or more processors, cause the one or more processors to perform the steps of:

receiving a bandwidth request at one of the input ports;

generating a plurality of clusters based upon a transmission constraint associated with the output ports, each of the clusters designating a portion of a plurality of destination sites, wherein the destination sites are downlink cells and the transmission constraint specifies restriction of transmission to a portion of the downlink cells that are within a system limit interference distance, the generating step including, determining an interference region for each of the downlink cells in a coverage area, and determining the clusters within the interference region of a targeted one of the downlink cells;

generating a critical cluster list based upon traffic statistics of the downlink cells;

determining a cluster threshold corresponding to traffic load distribution among a portion of the plurality of clusters, each of the clusters specifying a maximal set of the downlink cells that conform with the transmission constraint;

selectively granting the bandwidth request based upon the step of determining the cluster threshold and the critical cluster list.

34. A computer-readable medium carrying one or more sequences of one or more instructions for performing congestion avoidance in a switching system having a plurality of input ports and a plurality of output ports, the one or more sequences of one or more instructions including instructions which, when executed by one or more processors, cause the one or more processors to perform the steps of:

receiving a bandwidth request at one of the input ports;

generating a plurality of clusters based upon a transmission constraint associated with the output ports, each of the clusters designating a portion of a plurality of destination sites, wherein the destination sites are downlink cells and the transmission constraint specifies restriction of transmission to a portion of the downlink cells that are within a system limit interference distance the generating step including, determining an interference region for each of the downlink cells in a coverage area, computing a plurality of angles between the target downlink cell and remaining ones of the downlink cells in the coverage area, comparing the computed angles corresponding to the downlink cells with a predetermined angle, and designating downlink cells to be in the interference region if the downlink cells have corresponding angles that are less than or equal to the predetermined angles, and determining the clusters within the interference region of a targeted one of the downlink cells;

determining a cluster threshold corresponding to traffic load distribution among a portion of the plurality of clusters, each of the clusters specifying a maximal set of the downlink cells that conform with the transmission constraint; and selectively granting the bandwidth request based upon the step of determining the cluster threshold.

35. The computer readable medium according to claim 34, wherein the step of determining the interference region further comprises:

selectively designating dummy downlink cells around the target downlink call based upon position of the target downlink cell within the coverage area.

36. A computer-readable medium carrying one or more sequences of one or more instructions for performing congestion avoidance in a switching system having a plurality of input ports and a plurality of output ports, the one or more sequences of one or more instructions including instructions which, when executed by one or more processors, cause the one or more processors to perform the steps of:

receiving a bandwidth request at one of the input ports;

generating a plurality of clusters based upon a transmission constraint associated with the output ports, each of the clusters designating a portion of a plurality of destination sites, wherein the destination sites are downlink cells and the transmission constraint specifies restriction of transmission to a portion of the downlink cells that are within a system limit interference distance the generating step including, determining an interference region for each of the downlink cells in a coverage area, and determining the clusters within the interference region of a targeted one of the downlink cells including, determining which of the downlink cells within the interference region are located on a periphery of the interference region, selecting a predetermined number of peripheral downlink cells to designate as being a part of the cluster, computing angles between each of the downlink cells within the interference region and each of the peripheral downlink cells, and designating a portion of the downlink cells within the interference region to be a part of the cluster if the angle between each of the downlink cells within the interference region and each of the peripheral downlink cells is less than or equal to the predetermined angle;

determining a cluster threshold corresponding to traffic load distribution among a portion of the plurality of clusters, each of the clusters specifying a maximal set of the downlink cells that conform with the transmission constraint; and selectively granting the bandwidth request based upon the step of determining the cluster threshold.

37. A computer-readable medium carrying one or more sequences of one or more instructions for performing congestion avoidance in a switching system having a plurality of input ports and a plurality of output ports, the one or more sequences of one or more instructions including instructions which, when executed by one or more processors, cause the one or more processors to perform the steps of:

receiving a bandwidth request at one of the input ports;

generating a plurality of clusters based upon a transmission constraint associated with the output ports, each of the clusters designating a portion of a plurality of destination sites, wherein the destination sites are downlink cells and the transmission constraint specifies restriction of transmission to a portion of the downlink cells that are within a system limit interference distance the generating step including, determining an interference region for each of the downlink cells in a coverage area, and determining the clusters within the interference region of a targeted one of the downlink cells;

eliminating clusters that are redundant and duplicative;

generating a cluster list based upon the eliminating step;

determining a cluster threshold corresponding to traffic load distribution among a portion of the plurality of clusters, each of the clusters specifying a maximal set of the downlink cells that conform with the transmission constraint; and selectively granting the bandwidth request based upon the cluster list and the step of determining the cluster threshold.

38. The computer readable medium according to claim 33, wherein the cluster threshold in the step of determining is based upon a Time Division Multiple (TDMA) slot.

39. The computer readable medium according to claim 33, further comprising computer-executable instructions for causing the computer system to perform the steps of:

determining another cluster threshold, wherein the selectively granting step is based upon the plurality of cluster thresholds.

40. The computer readable medium according to claim 37, wherein the bandwidth request in the receiving step is at least one of a connection-oriented (CO) request and a connectionless (CL) request.

41. The computer readable medium according to claim 40, further comprising computer-executable instructions for causing the computer system to perform the steps of:
   determining a destination address associated with the bandwidth request;
   determining whether the bandwidth request is the CO request or the CL request, wherein the GO request has a higher priority than the CL request, the CO request being at least one of a CO session release request and a CO session setup release request; and
   determining an amount of desired bandwidth.

42. The computer readable medium according to claim 41, further comprising computer-executable instructions for causing the computer system, to perform the steps of:
   accumulating a plurality of bandwidth requests;
   processing the CO session release requests;
   processing the CO session setup requests; and
   processing the CL requests.

43. The computer readable medium according to claim 42, wherein the step of processing the CO session release requests comprises:
   releasing bandwidth allocations from the clusters within the cluster list having a downlink cell associated with the destination address.

44. The computer readable medium according to claim 42, wherein the step of processing the CO session setup requests comprises:
   determining available bandwidths of the clusters that have a downlink cell associated with the destination address based upon a difference between the cluster threshold and current traffic loads of the corresponding clusters; and
   computing available bandwidths for the CO session setup requests based upon the step of determining available bandwidths of the clusters, wherein each of the available bandwidths for the CO session setup requests is set to a minimum value of the available bandwidths of the clusters,
   wherein the step of selectively granting comprises allocating a granted bandwidth based upon a minimum of the requested bandwidth and the available bandwidth.

45. The computer readable medium according to claim 42, wherein the step of processing the CL requests comprises:
   determining available bandwidths of the clusters that have a downlink cell associated with the destination address based upon a difference between the cluster threshold and current traffic loads of the corresponding clusters; and
   computing available bandwidths for the CL service requests based upon the step of determining available bandwidths of the clusters, wherein each of the available bandwidths for the CL service requests is set to a minimum value of the available bandwidths of the clusters,
   wherein the step of selectively granting comprises allocating a granted bandwidth based upon a minimum of the requested bandwidth and the available bandwidth.

46. The computer readable medium according to claim 33, wherein, in the step of generating, the destination sites are nodes and the transmission constraint specifies a routing limitation associated with simultaneous transmission to a portion of the nodes.

47. The computer readable medium according to claim 46, wherein each of the clusters in the determining step specifies a maximal set of the nodes that conform with the transmission constraint.

48. The computer readable medium according to claim 42, wherein the step of selectively granting comprises allocating a granted bandwidth equal to the desired bandwidth if the destination address of the request does not correspond to a downlink cell within the cluster list.

49. A method of providing congestion avoidance associated with a plurality of cells, the method comprising:
   generating a plurality of clusters based upon a transmission constraint that specifies restriction of transmission to a portion of the cells that are within a system limit interference distance, each of the clusters designating a portion of a plurality of destination sites;
   determining an interference region for each of the cells in a coverage area;
   determining the clusters within the interference region of a targeted one of the cells;
   generating a critical cluster list based upon traffic statistics including the traffic load distribution of the cells;
   determining a cluster threshold corresponding to traffic load distribution among a portion of the plurality of clusters; and
   selectively granting a bandwidth request based upon the critical cluster list and satisfaction of the cluster threshold.

50. A method of providing congestion avoidance associated with a plurality of cells, the method comprising:
   generating a plurality of clusters based upon a transmission constraint that specifies restriction of transmission to a portion of the cells that are within a system limit interference distance, each of the clusters designating a portion of a plurality of destination sites including,
      determining an interference region for each of the cells in a coverage area;
      determining the clusters within the interference region of a targeted one of the cells;
      computing a plurality of angles between the target cell and remaining ones of the cells in the coverage area;
      comparing the computed angles corresponding to the cells with a predetermined angle;
      designating cells to be in the interference region if the cells have corresponding angles that are less than or equal to the predetermined angles;
   determining a cluster threshold corresponding to traffic load distribution among a portion of the plurality of clusters; and
   selectively granting a bandwidth request based upon satisfaction of the cluster threshold.

51. A method of providing congestion avoidance associated with a plurality of cells, the method comprising:
   generating a plurality of clusters based upon a transmission constraint that specifies restriction of transmission to a portion of the cells that are within a system limit interference distance, each of the clusters designating a portion of a plurality of destination sites including,
      determining an interference region for each of the cells in a coverage area, and
      determining the clusters within the interference region of a targeted one of the cells including,
         determining which of the cells within the interference region are located on a periphery of the interference region, selecting a predetermined number of peripheral cells to designate as being a part of the cluster, computing angles between each of the cells within the interference region and each of the peripheral cells, designating a portion of the cells within the interference region to be a part of the cluster if the angle between each of the cells within the interference region and each of the peripheral cells is less than or equal to the predetermined angle;

determining a cluster threshold corresponding to traffic load distribution among a portion of the plurality of clusters; and selectively granting a bandwidth request based upon satisfaction of the cluster threshold.

52. A method of providing congestion avoidance associated with a plurality of cells, the method comprising:

generating a plurality of clusters based upon a transmission constraint that specifies restriction of transmission to a portion of the cells that are within a system limit interference distance, each of the clusters designating a portion of a plurality of destination sites including, determining an interference region for each of the cells in a coverage area, and determining the clusters within the interference region of a targeted one of the cells;

eliminating clusters that are redundant and duplicative;

generating a cluster list based upon the eliminating step;

determining a cluster threshold corresponding to traffic load distribution among a portion of the plurality of clusters; and selectively granting a bandwidth request based upon the cluster list and satisfaction of the cluster threshold.

* * * * *